(12) United States Patent
Lin et al.

(10) Patent No.: US 8,878,085 B2
(45) Date of Patent: Nov. 4, 2014

(54) INPUT DEVICE AND MANUFACTURING METHOD THEREOF

(75) Inventors: Yin Yu Lin, New Taipei (TW); Yen-Bo Lai, New Taipei (TW); Shu I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 300 days.

(21) Appl. No.: 13/460,070

(22) Filed: Apr. 30, 2012

(65) Prior Publication Data

US 2013/0140165 A1 Jun. 6, 2013

(30) Foreign Application Priority Data

Dec. 5, 2011 (TW) .............................. 100144746 A

(51) Int. Cl.
*H01H 9/00* (2006.01)
(52) U.S. Cl.
USPC ......................................... 200/292; 200/341
(58) Field of Classification Search
CPC ....................................................... H01H 9/00
USPC .................................... 200/292; 439/82, 751
See application file for complete search history.

(56) References Cited

U.S. PATENT DOCUMENTS

| | | | | |
|---|---|---|---|---|
| 6,477,059 | B1 * | 11/2002 | Ono et al. ...................... | 361/785 |
| 2002/0185364 | A1 | 12/2002 | Takahashi et al. | |
| 2010/0078301 | A1 | 4/2010 | Yeh | |
| 2011/0242777 | A1 * | 10/2011 | Zhou .............................. | 361/760 |
| 2011/0267272 | A1 * | 11/2011 | Meyer et al. ................... | 345/168 |

FOREIGN PATENT DOCUMENTS

| | | |
|---|---|---|
| JP | S60-136151 U | 9/1985 |
| JP | US61-186273 U | 11/1986 |
| JP | US62-023028 U | 2/1987 |
| JP | US62-187337 U | 11/1987 |
| JP | H04250516 A | 9/1992 |
| JP | UH05-011242 U | 2/1993 |
| JP | 06-019601 A | 1/1994 |
| JP | 09-162061 A | 6/1997 |
| JP | H11329142 A | 11/1999 |
| JP | 2001195948 B | 7/2001 |
| JP | 2006-002370 A | 1/2006 |
| TW | I256573 B | 6/2006 |
| TW | M321127 U | 10/2007 |
| TW | M394522 U | 12/2010 |

* cited by examiner

*Primary Examiner* — Renee Luebke
*Assistant Examiner* — Ahmed Saeed
(74) *Attorney, Agent, or Firm* — Chun-Ming Shih

(57) ABSTRACT

An input device and a manufacturing method of the input device are provided. The input device includes a circuit board and a plurality of mechanical switches. The circuit board has a first surface, a second surface and a plurality of conductive sheets, the second surface and the first second surface are opposed each other. A plurality of holes are formed on the circuit board and the conductive sheets are disposed at one side of the first surface in pairs around the hole, and each of the conductive sheets has a coupling section bent away from the first surface and the second surface. The mechanical switches are detachable from the circuit board, and each mechanical switch includes a plunger and a plurality of pins. Each of the mechanical switches has a positioning column inserted in the hole. One end of the pin is connected to the plunger, and the other end of the pin passes through the circuit board and is attached to the coupling section of the conductive sheets for the mechanical switch to be electrically connected to the circuit board.

15 Claims, 35 Drawing Sheets

INPUT DEVICE AND MANUFACTURING METHOD THEREOF

CROSS-REFERENCE TO RELATED APPLICATIONS

This application claims the benefit of the filing date of Taiwan Patent Application No. 100144746, filed on 2011 Dec. 5, in the Taiwan Intellectual Property Office, the disclosure of which is incorporated herein in its entirety by reference.

BACKGROUND OF THE INVENTION

1. Field of Invention

This invention is relative to an input device, in particular, relative to an input device with mechanical switch which can be replaced individually.

2. Related Art

Keyboards are the first and the most commonly used peripheral input devices. Although many other input devices such as mice, touch panels, digital pens or even sound-actuated mobiles (SAM) had been developed, they are still essential peripheral input devices currently for the advantages of low cost and capability of being input a large number of characters during a short period of time.

The keyboard can be commonly divided into the membrane keyboard and the mechanical keyboard according to how the keys are actuated. The mechanical keyboard is mainly constructed from a keycap, a mechanical switch and a circuit board, in which every button has its own independent keycap, mechanical switch and conductive sheet corresponding to the circuit board. When the keycap is pressed by the user for data input with the keyboard, the mechanical switch and the conductive sheet connected to the circuit board will be jointly actuated by the keycap to generate an electrical signal to the computer, thereby completed a signal input operation.

The mechanical keyboard has a much longer service life and a better tactile sensation than the membrane keyboard, and the mechanical switch of the former could be replaced individually. Hence, the mechanical keyboard is still the professional user's favorite even though it is much more expensive. Besides, the mechanical switch of the mechanical keyboard can be divided into five different types of brown stemmed switches, blue stemmed switches, black stemmed switches, white stemmed switches and red stemmed switches according to the way of actuation. The depression force and tactile feedback vary with the construction of the mechanical switch. The users can select a specified type of switch as required.

However, the mechanical switch of the conventional mechanical keyboard is still fixed. In order to make the mechanical switch electrically be connected to the circuit board, the mechanical switch is welded to the circuit board by soldering during the production process of the mechanical keyboard. Thus, the mechanical switch and the circuit board are secured and cannot be separated easily. Whenever any mechanical switch is out of order, it cannot be replaced easily by the user, so the service life of the mechanical keyboard will be shortened.

Meanwhile, it is almost impossible to change different types of mechanical switches according to the users' preferences because of the limitation of the conventional technology mentioned above. So, there is a need to improve the conventional mechanical keyboard for the user's convenience.

SUMMARY OF THE INVENTION

Accordingly, the present invention provides an input device with the mechanical switch which can be replaced individually and the manufacturing method thereof. The present invention can solve the aforesaid problems of the conventional mechanical keyboards that the mechanical switches cannot be changed individually since the mechanical switches are soldered to the circuit board.

The present invention provides an input device. The input device includes a circuit board and a plurality of mechanical switches. The circuit board has a first surface, a second surface and a plurality of conductive sheets, wherein the first surface and the second surface are formed opposite to each other. A plurality of holes are formed on the circuit board and the conductive sheets are disposed on one side of the first surface in pair around each corresponding hole, and each of the conductive sheets has a coupling section. The mechanical switches are detachable provided on the second surface of the circuit board, every mechanical switch includes an plunger and a plurality of pins, each of the mechanical switches has a positioning column and the positioning column is extended from the bottom of the mechanical switch and is inserted in the hole, one end of the pins connect to the plunger, the other end of the pins is configured to pass through the circuit board and attach to the coupling section of the conductive sheets for the mechanical switches electrically connecting to the circuit board respectively.

The present invention further provides a manufacturing method of the input device which includes following steps. Firstly, providing a circuit board, a plurality of holes being formed on the circuit board, then providing a plurality of conductive sheets on a first surface of the circuit board, the conductive sheets are deployed on one side of the circuit board around every holes in pair, each of the conductive sheets being bended and formed a coupling section, then providing a plurality of mechanical switches, each of the mechanical switches comprising a plunger, a plurality of pins, and a positioning column, and then installing the mechanical switch on a second surface of the circuit board, inserting the positioning column of the mechanical switch in the holes, leading the pins to pass through the circuit board and be attached to the corresponding coupling sections of the conductive sheets for the mechanical switches to electrically connected to the circuit board.

The present invention is featured by electrically plugging the mechanical switch on the circuit board in modular approach and leading the pins of the mechanical switch to pass through the circuit board and attach to the corresponding conductive sheets on the circuit board. The mechanical switches are electrically connected to the circuit board and detachable without being soldered. Hence, users can easily replace the original mechanical switch on the circuit board with other types of mechanical switch, for example, mechanical switch with different pressure load, to meeting requirement and habit of the users.

Further objects, embodiments and advantages are apparent in the drawings and in the detailed description which follows.

BRIEF DESCRIPTION OF THE DRAWINGS

These and other features and advantages of the various embodiments disclosed herein will be better understood with respect to the following description and drawings, in which like numbers refer to like parts throughout, and in which.

DETAIL DESCRIPTION OF THE INVENTION

Figure 1:
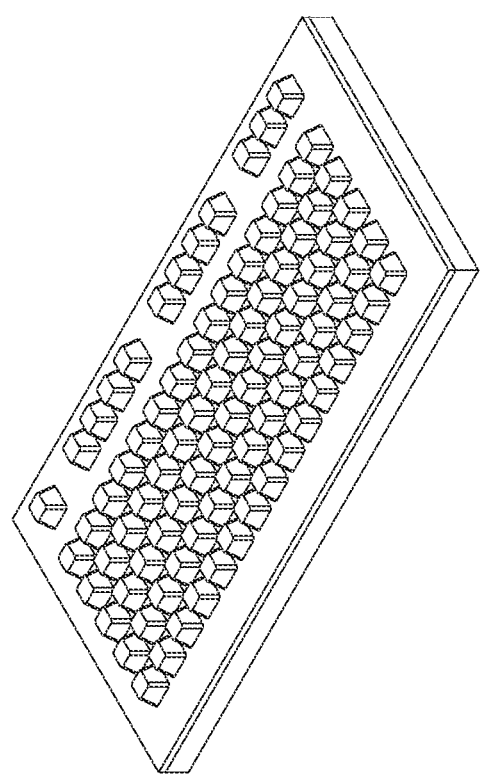
FIG. 1 illustrates a three-dimensional view of an input device of the present invention.
Figure 2:
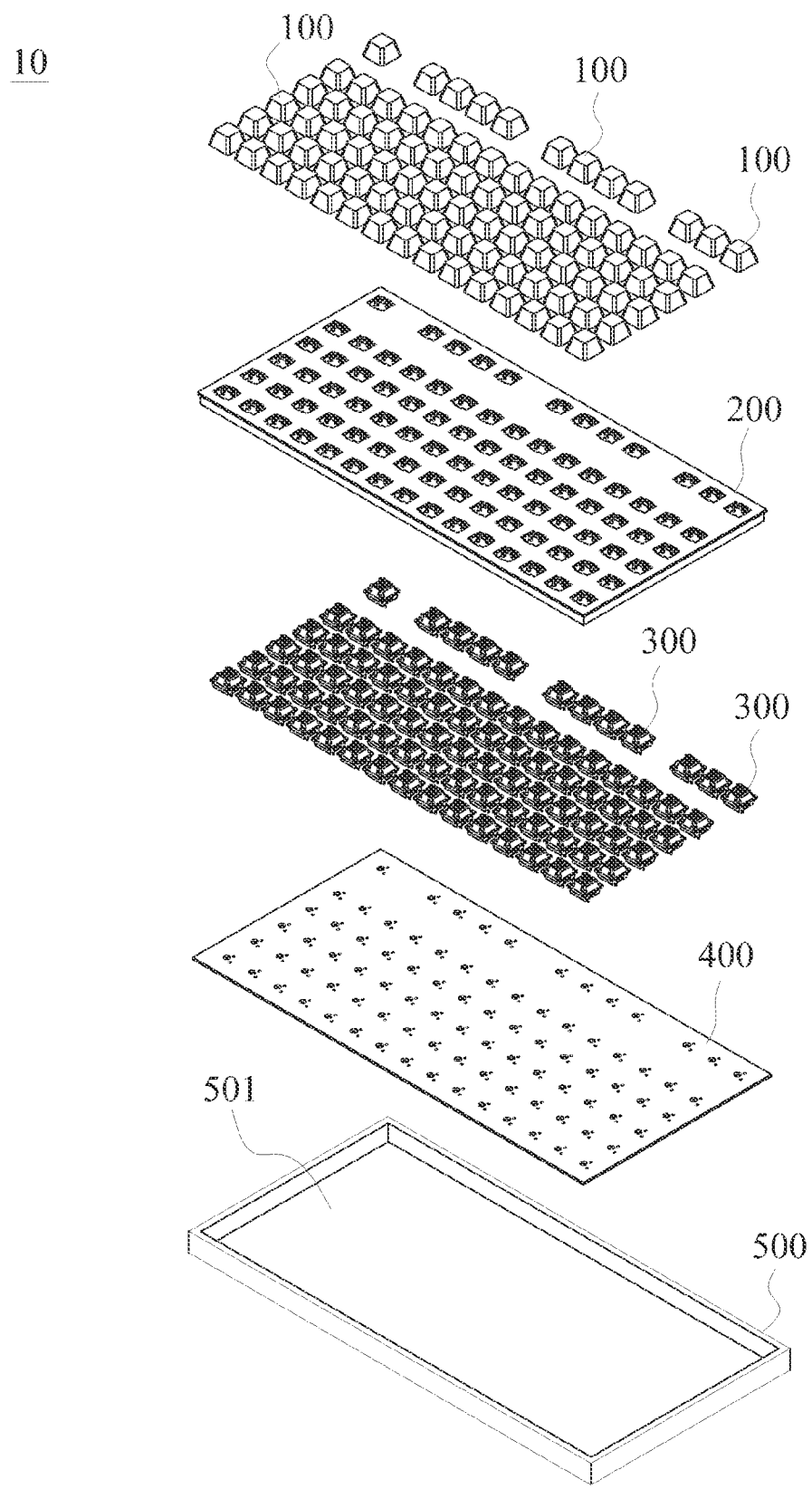
FIG. 2 illustrates an exploded view of the input device of the present invention.

FIGS. 1 and 2 are respectively a dimensional view and an exploded view of an input device 10 of the present invention. Referring to FIGS. 1 and 2, in the first embodiment, the input device 10 includes a plurality of keycaps 100, a second shell 200, a plurality of mechanical switches 300, a circuit board 400 and a first shell 500. The first shell 500 has a space 501, the circuit board 400 is accommodated within the space 501. In addition, the structures of the mechanical switches 300 and the other elements together with the connecting relationship between the constituent elements will also be described in the following paragraphs.

Figure 3:
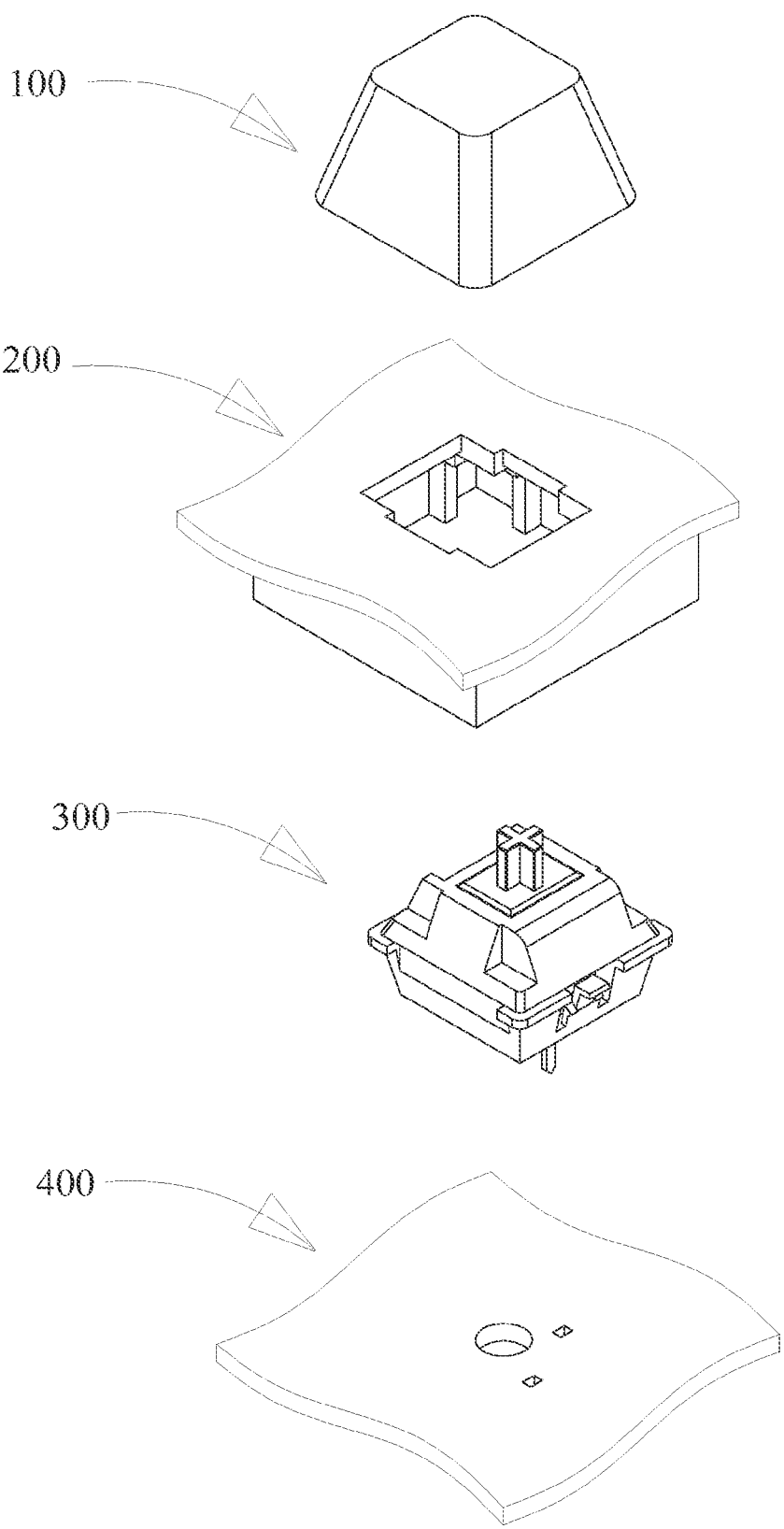
FIG. 3 illustrates a partial view of the input device according to a first embodiment of the present invention.

FIG. 3 is a partial view of the input device 10 according to a first embodiment of the present invention. It is noted that the following description will focus on the region as shown in FIG. 3 for emphasizing the technical features of the present invention. It will also make the description of the present invention clear enough and fully disclosed for people with ordinary skill in this art to practice according thereto. Also, please refer to the complete structure of the input device 10 as illustrated in FIG. 1 and FIG. 2 when reading the following paragraphs.

Figure 4:
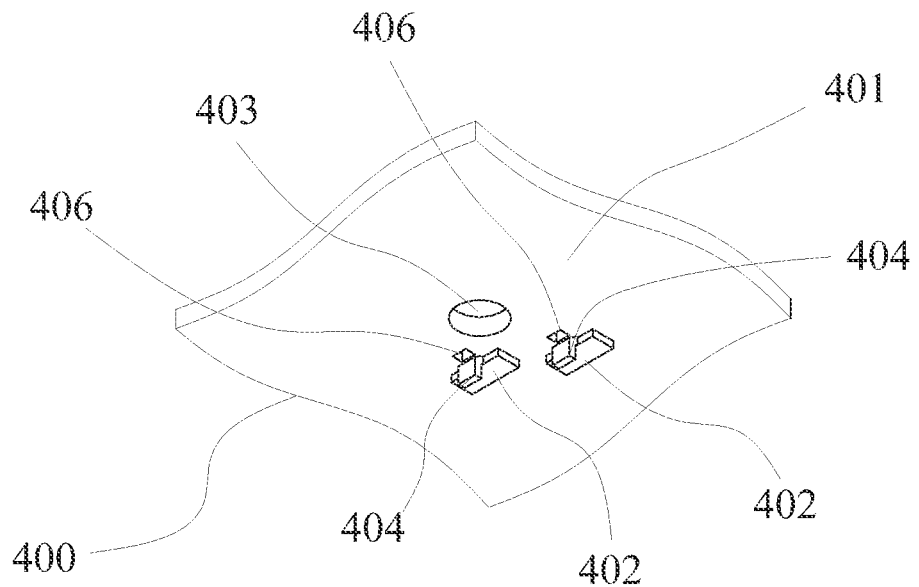
FIG. 4 illustrates a partial view of a circuit board according to the first embodiment of the present invention.
Figure 5:
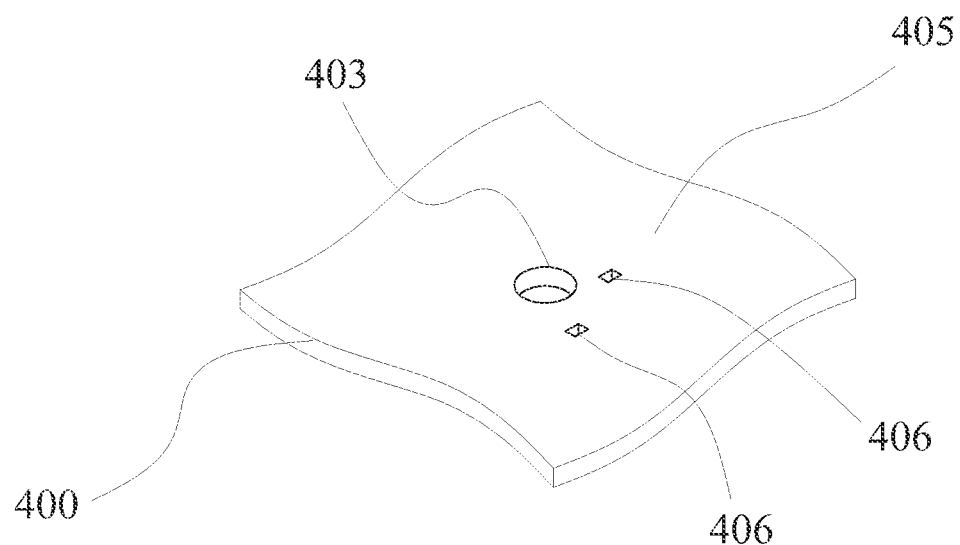
FIG. 5 illustrates another partial view of the circuit board according to the first embodiment of the present invention.

FIGS. 4 and 5 are different partial views of a circuit board 400 according to the first embodiment of the present invention. In the first embodiment, as shown in FIGS. 4, 5 along with FIGS. 2 and 3, the circuit board 400 of the input device 10 has a first surface 401 and a second surface 405 formed opposite to each other. The circuit board 400 also has a plurality of conductive sheets 402. A plurality of holes 403 and a plurality of perforations 406 are formed on the circuit board 400. The perforations 406 are deployed in pairs around each of the holes 403, and the conductive sheets 402 are deployed next to each perforation 406 in pairs on the first surface 401. Besides, each of the conductive sheets 402 has a coupling section 404 which bends away from the first surface 401 and the second surface 405.

Figure 6:
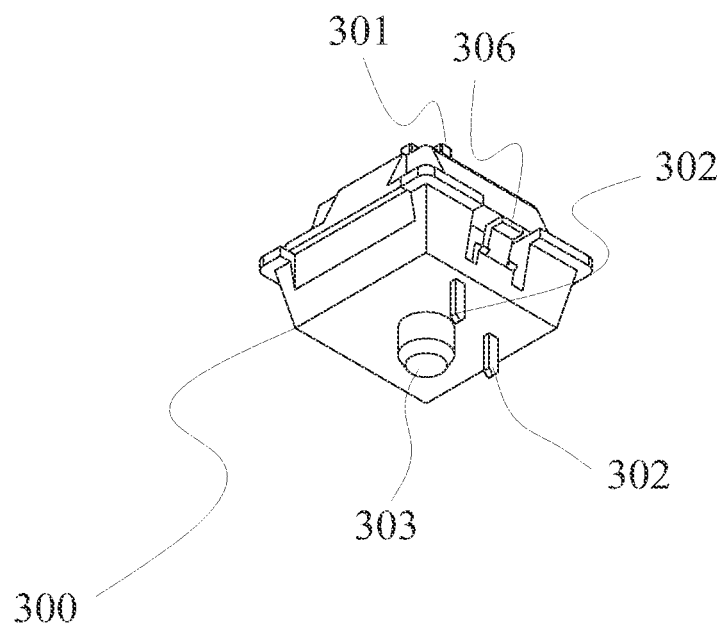
FIG. 6 illustrates a partial view of a mechanical switch according to the first embodiment of the present invention.

FIG. 6 is a partial view of the mechanical switch 300 of the input device 10 according to the first embodiment of the present invention. As shown in FIGS. 2, 3 and 6, each of the mechanical switches 300 of the input device 10 in the first embodiment includes a plunger 301 and a plurality of pins 302. Each of the mechanical switches 300 further includes a positioning column 303 and a carrying portion 306. When one of the mechanical switch 300 is connected to the circuit board 400, the positioning column 303 is inserted in the hole 403, so that one end of the pin 302 connected to the plunger 301, and the other end of the pin 302 passes through the circuit board 400 to be attached against the coupling section 404 of the conductive sheet 402. In this way, the mechanical switch 300 is detachably provided on the second surface 405 of the circuit board 400 and electrically connected to the circuit board 400.

It is noted that the mechanical switches 300 herein are common mechanical switches used in the mechanical keyboard. The mechanical switches can be divided into several types according to the pressure load that is defined to be the minimum pressure at which the mechanical switch can be actuated when being pressed. The mechanical switch has varying pressure load and tactile feedback depending on the internal structure thereof.

As described above, the mechanical switches can be mainly divided into five different types, i.e. brown stemmed switches, blue stemmed switches, black stemmed switches, white stemmed switches and red stemmed switches. In this embodiment, the pressure load of one of the mechanical switches 300 could be identical to or different from another mechanical switch 300. That is, in the input device 10, the mechanical switches 300 can be all the same partly the same, or different from one another as the case may be.

For example, for the keys of the input device 10 usually pressed with thumbs, forefingers, or middle fingers, the mechanical switches 300 with larger pressure load (high force switch) may be used, while for the keys of the input device 10 usually pressed with ring fingers or pinkies, the mechanical switches 300 with smaller pressure load (low force switch). The mechanical switches 300 of the invention can be replaced easily as the user wishes any time without complex procedures because the mechanical switches 300 are directly mounted on the circuit board 400 in a detachable way.

Figure 7:
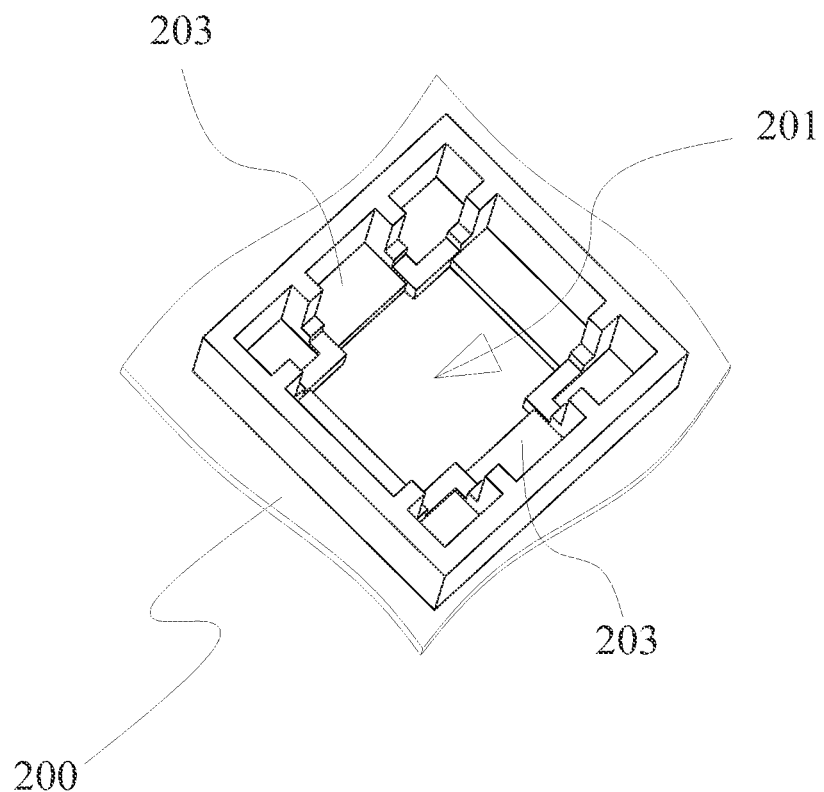
FIG. 7 illustrates a partial view of a second shell according to the first embodiment of the present invention.

FIG. 7 is a partial view of the second shell 200 of the input device 10 according to the first embodiment of the present invention. As shown in FIGS. 2, 3 and 7, the second shell 200 of the input device 10 is combined with the first shell 500 and depressed against the plungers 301 of the mechanical switch 300. The second shell 200 has a plurality of openings 201 corresponding to the mechanical switches 300. When one of the mechanical switch 300 is connected to the second shell 200, every plunger 301 of the mechanical switch 300 is assembled through the corresponding opening 201. Besides, a plurality of keycaps 100 of the input device 10 are detachably provided at the other side of the mechanical switch 300 with respect to the positioning column 303 and pins 302 by covering the corresponding plungers 301 individually.

Figure 17:
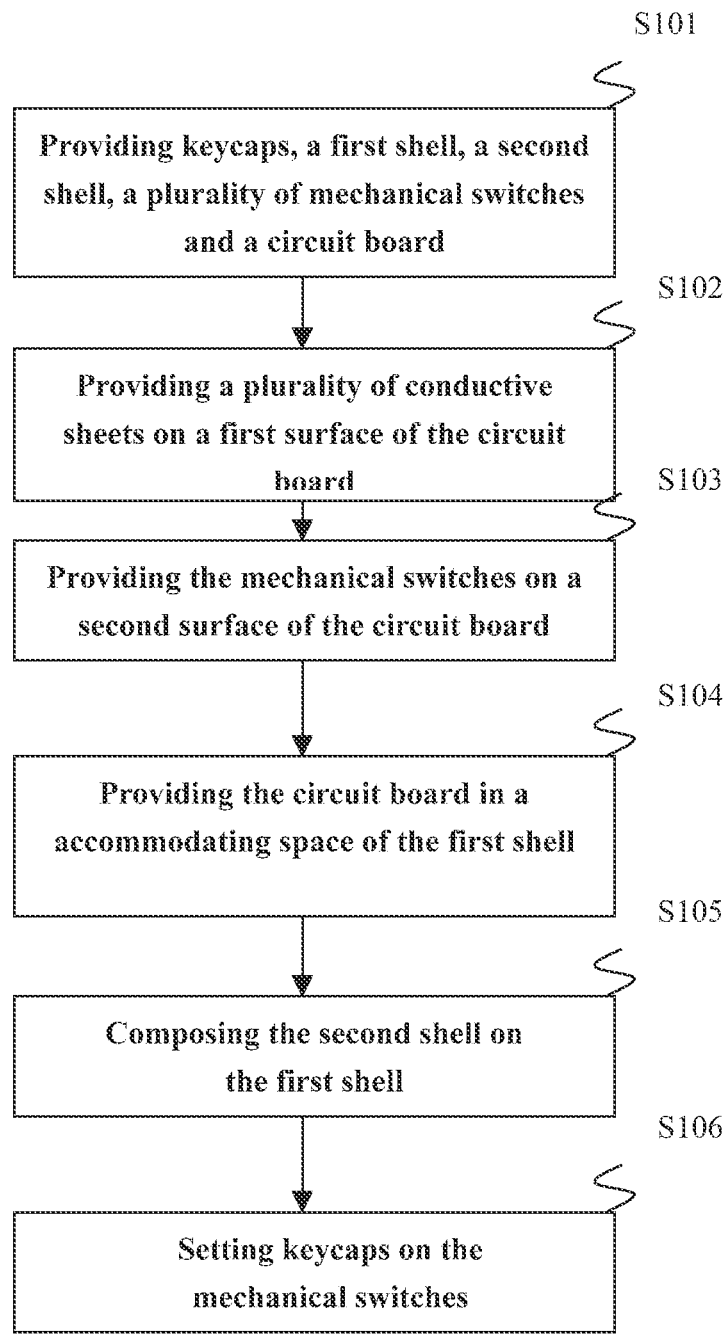
FIG. 17 illustrates a flow chart in the manufacturing method of the input device according to the first embodiment of the present invention.

FIG. 17 is a flow chart of the manufacturing method of the input device 10 according to the first embodiment of the present invention. The method of manufacturing the input device 10 of the present invention will be described in detail below. Referring to FIGS. 2 and 17, the method of manufacturing the input device 10 according to the first embodiment includes the following steps. In step S101, keycaps 100, the second shell 200, the plurality of mechanical switches 300, the circuit board 400 and the first shell 500 are provided. Then in step S102, a plurality of conductive sheets 402 for the circuit board 400 are provided on the first surface 401 thereof, in which the conductive sheets 402 are deployed in pairs at one side of the circuit board 400 adjacent to each hole 403, and a coupling section 404 is formed in each of the conductive sheets 402 by bending the conductive sheet 402 itself. Thus, the circuit board 400 with the configuration as illustrated in the above is obtained.

Figure 8:
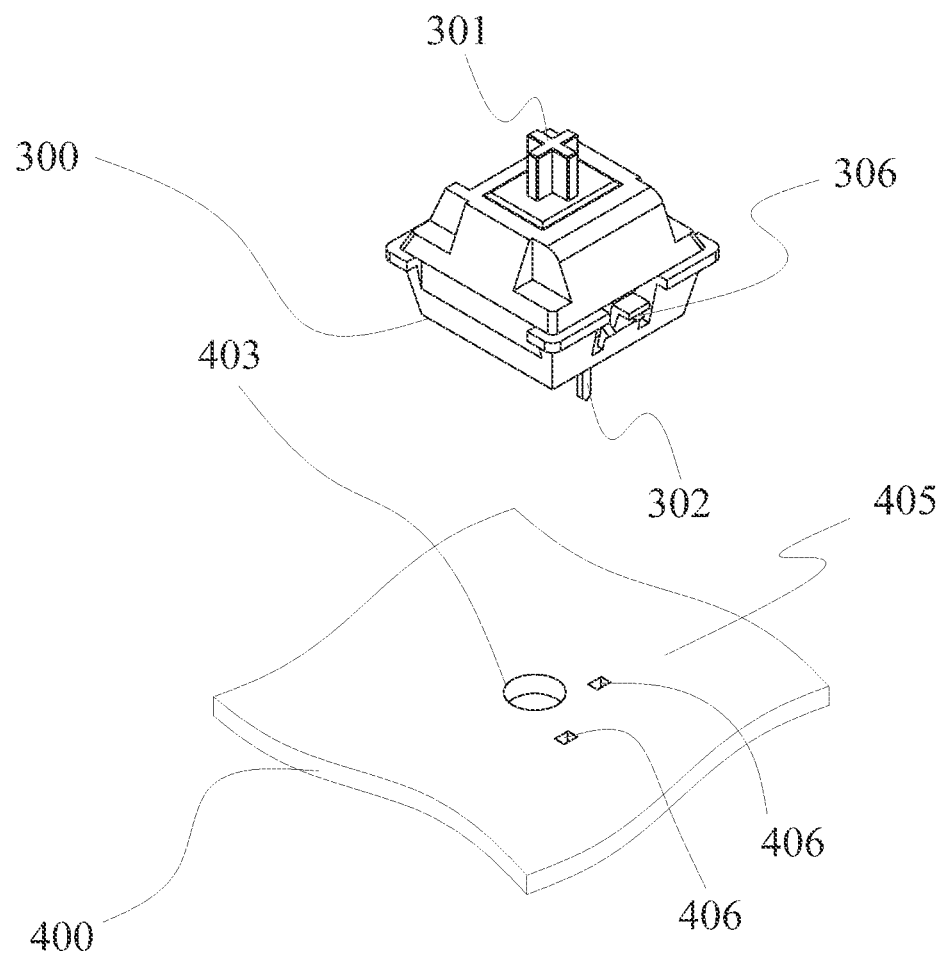
FIG. 8 illustrates an exploded view of the input device in accordance with a step in a manufacturing method of the input device according to the first embodiment of the present invention.
Figure 9:
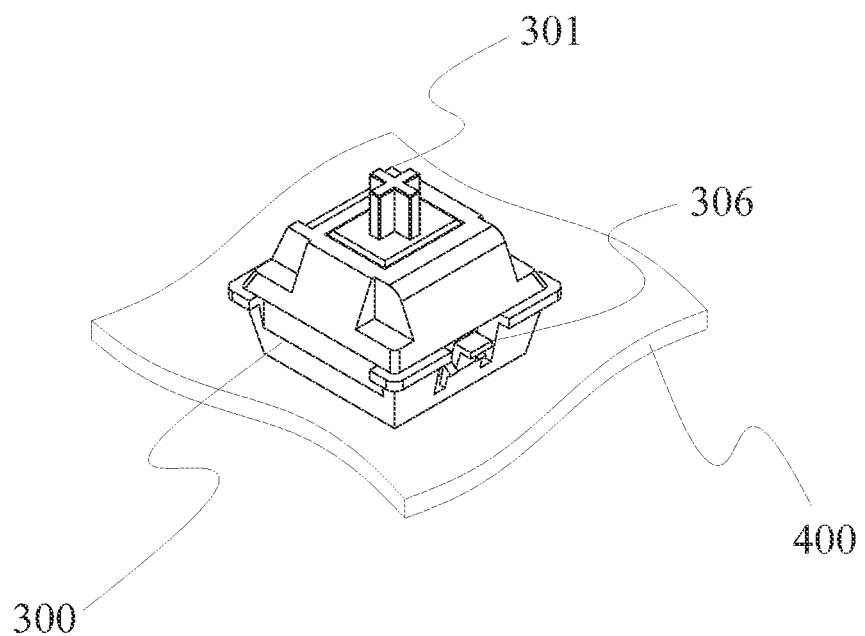
FIG. 9 illustrates a three-dimensional side view of the input device in accordance with a step in a manufacturing method of the input device according to the first embodiment of the present invention.
Figure 10:
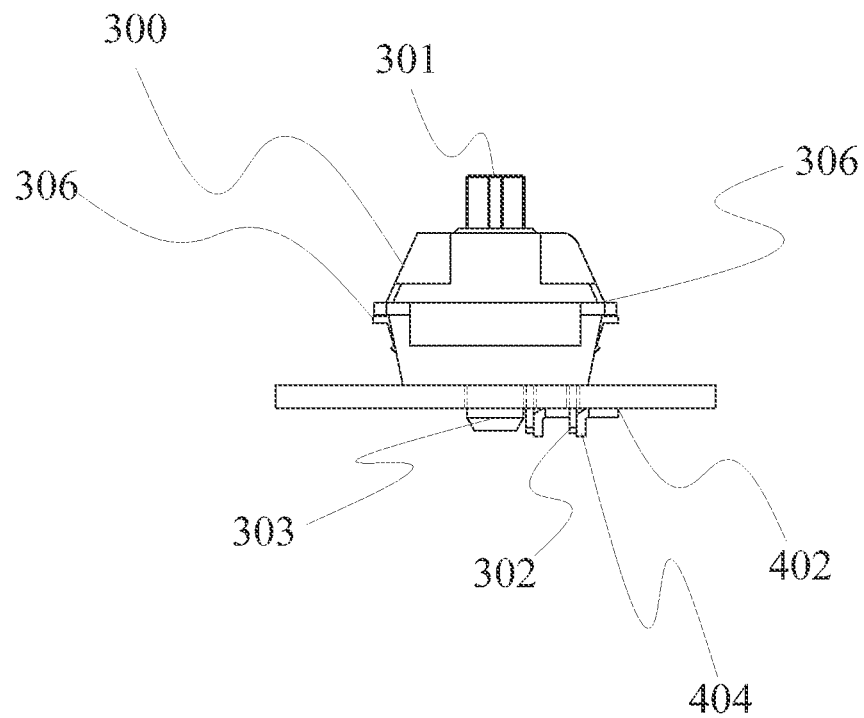
FIG. 10 illustrates a sectional view of the input device referring to FIG. 9 in accordance with a step in a manufacturing method of the input device according to the first embodiment of the present invention.

Next, in step S103, as shown in FIGS. 8-10 that illustrate step S103 in the method of manufacturing the input device 10 together with FIGS. 2 and 17, a plurality of mechanical switches 300 are provided on the second surface 405 of the circuit board 400. The positioning column 303 of the mechanical switches 300 are inserted in the hole 403. The pins 302 of the mechanical switches 300 pass through the circuit board 400 and contact with the coupling section 402 of the conductive sheet 402, so that the mechanical switches 300 can be electrically connected to the circuit board 400. Meanwhile, in the step of providing the mechanical switches 300 to the circuit board 400, it may be considered the mechanical switches 300 of different pressure loads could be selected as needed.

It is appreciated that the preliminary manufacture of the input device is completed once the mechanical switches 300 have been provided on the circuit board 400 in other embodiments of the present invention. If a plurality of keycaps 100 are further combined with the plungers 301 of the mechanical switches 300 correspondingly, the input device 10 can be used as the keyboard for the laptop or portable electronic device such as a mobile phone. In this embodiment, the keyboard of the desktop computer or server as the input device 10 is taken for illustration but the invention is not limited thereto.

Figure 11:
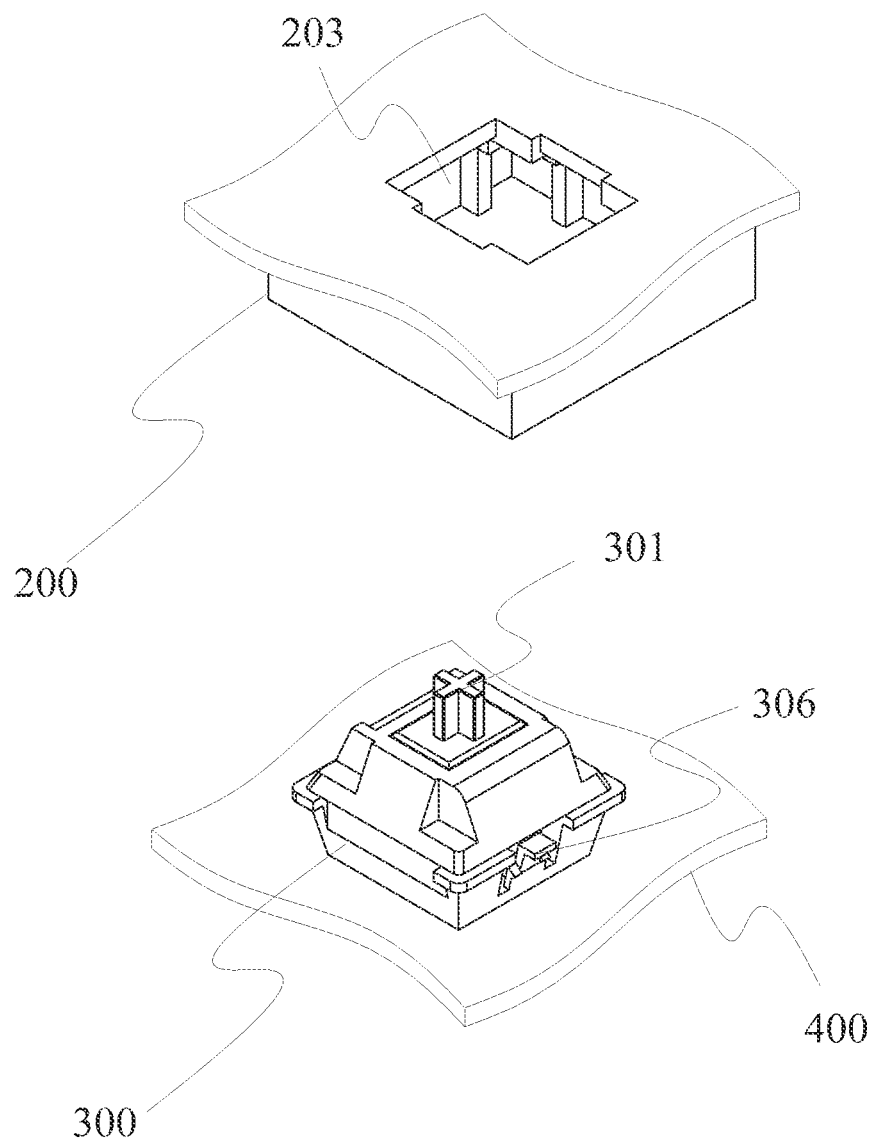
FIG. 11 illustrates an exploded view of the input device in accordance with another step in the manufacturing method of the input device according to the first embodiment of the present invention.
Figure 12:
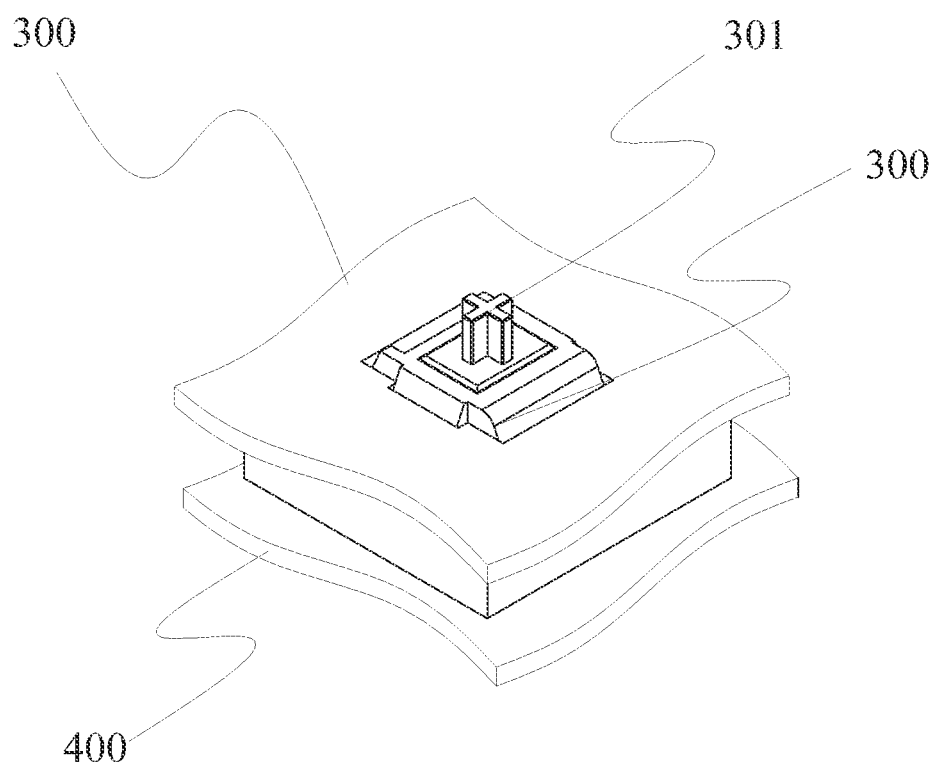
FIG. 12 illustrates a three-dimensional side view of the input device in accordance with another step in the manufacturing method of the input device according to the first embodiment of the present invention.
Figure 13:
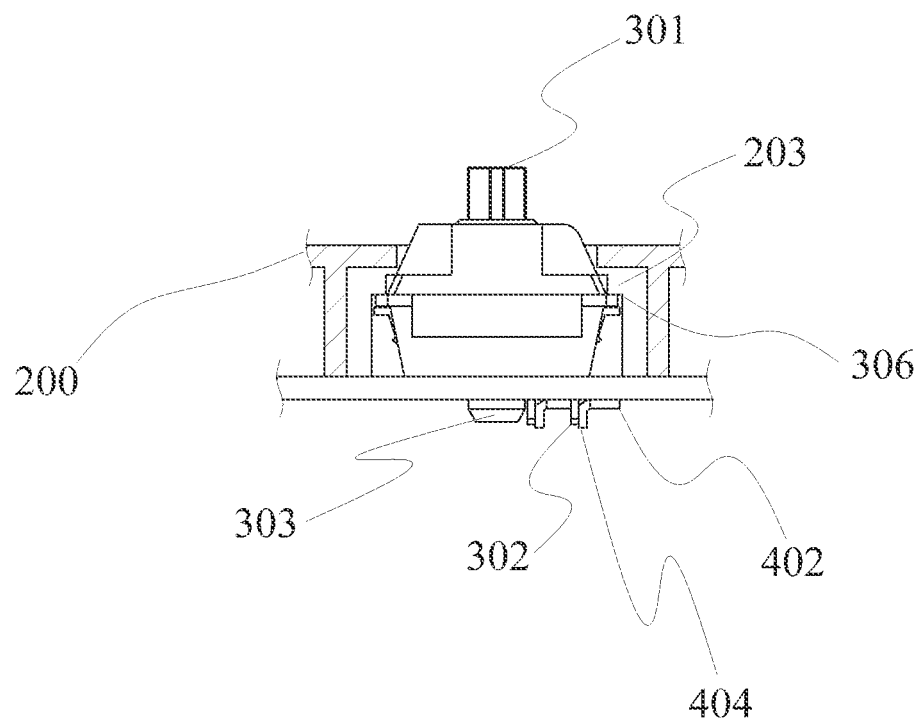
FIG. 13 illustrates a sectional view of the input device referring to FIG. 12 in accordance with another step in the manufacturing method of the input device according to the first embodiment of the present invention.

FIGS. 11-13 illustrate steps S104 and S105 in the method of manufacturing the input device 10 according to the first embodiment of the present invention. As shown in the figures, after connecting the circuit board 400 and the mechanical switch 300, the circuit board 400 is placed in the space 501 of the first shell 500 (S104), then the second shell 200 is combined with the first shell 500 (S105). The second shell 200 is depressed against the carrying portions 306 of the mechanical switches 300 by way of the press-sensitive portion 203. Hence, the plungers 301 of the mechanical switches 300 will be clasped between the second shell 200 and the circuit board 400 with part thereof assembled through the opening 201 of the second shell 200.

Figure 14:
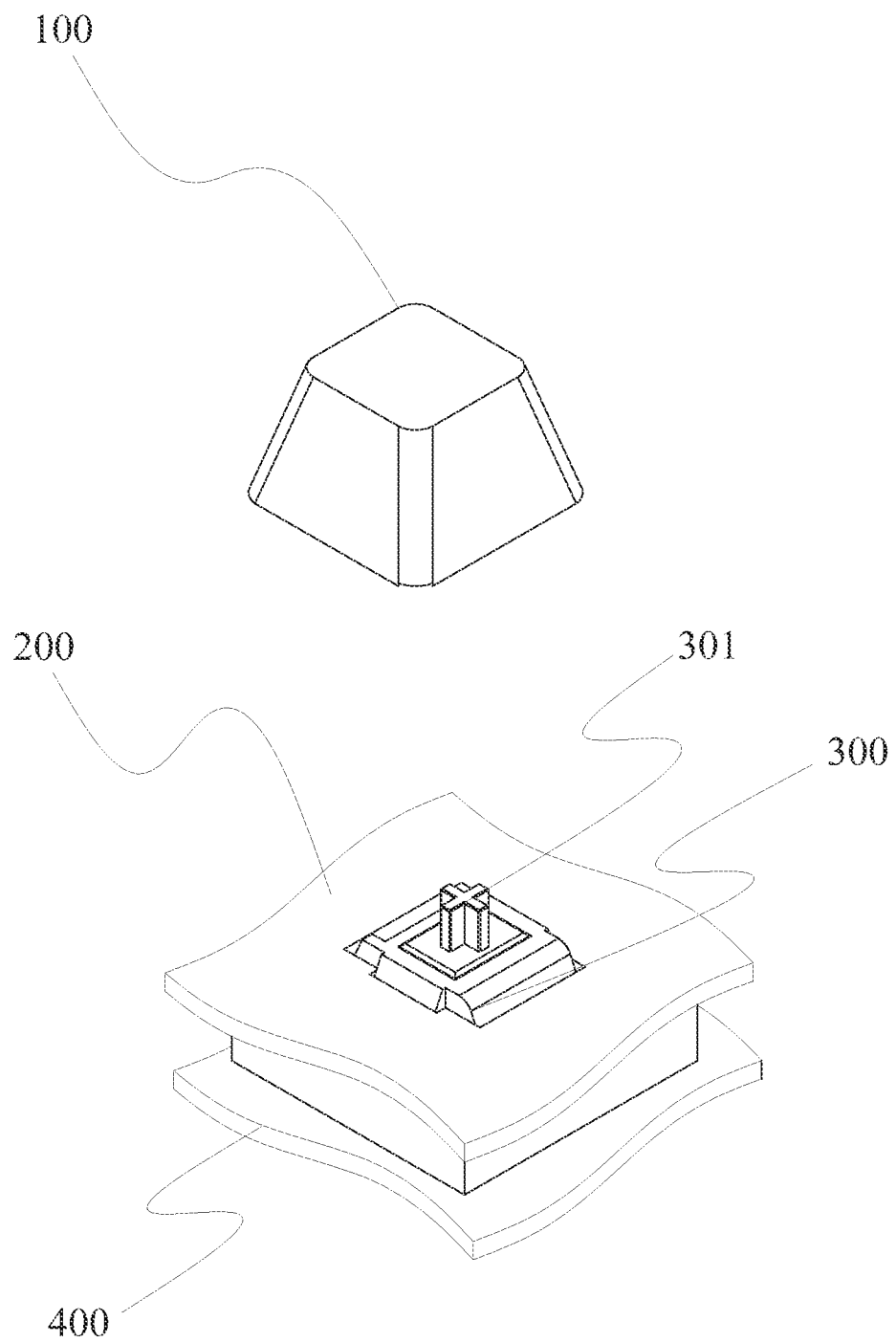
FIG. 14 illustrates an exploded view of the input device in accordance with still another step in the manufacturing method of the input device according to the first embodiment of the present invention.
Figure 15:
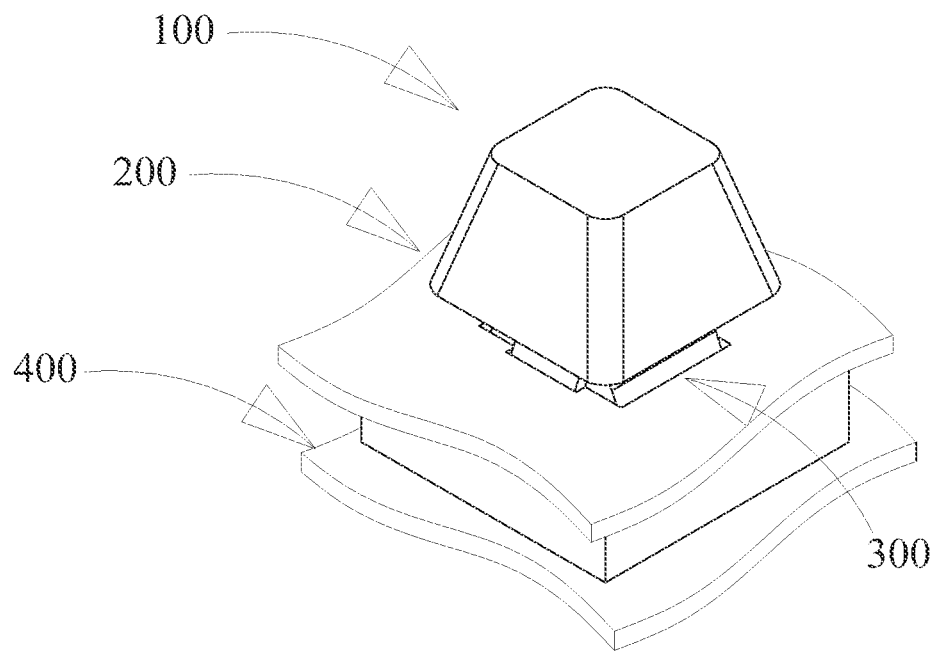
FIG. 15 illustrates a three-dimensional side view of the input device in accordance with still another step in the manufacturing method of the input device according to the first embodiment of the present invention.
Figure 16:
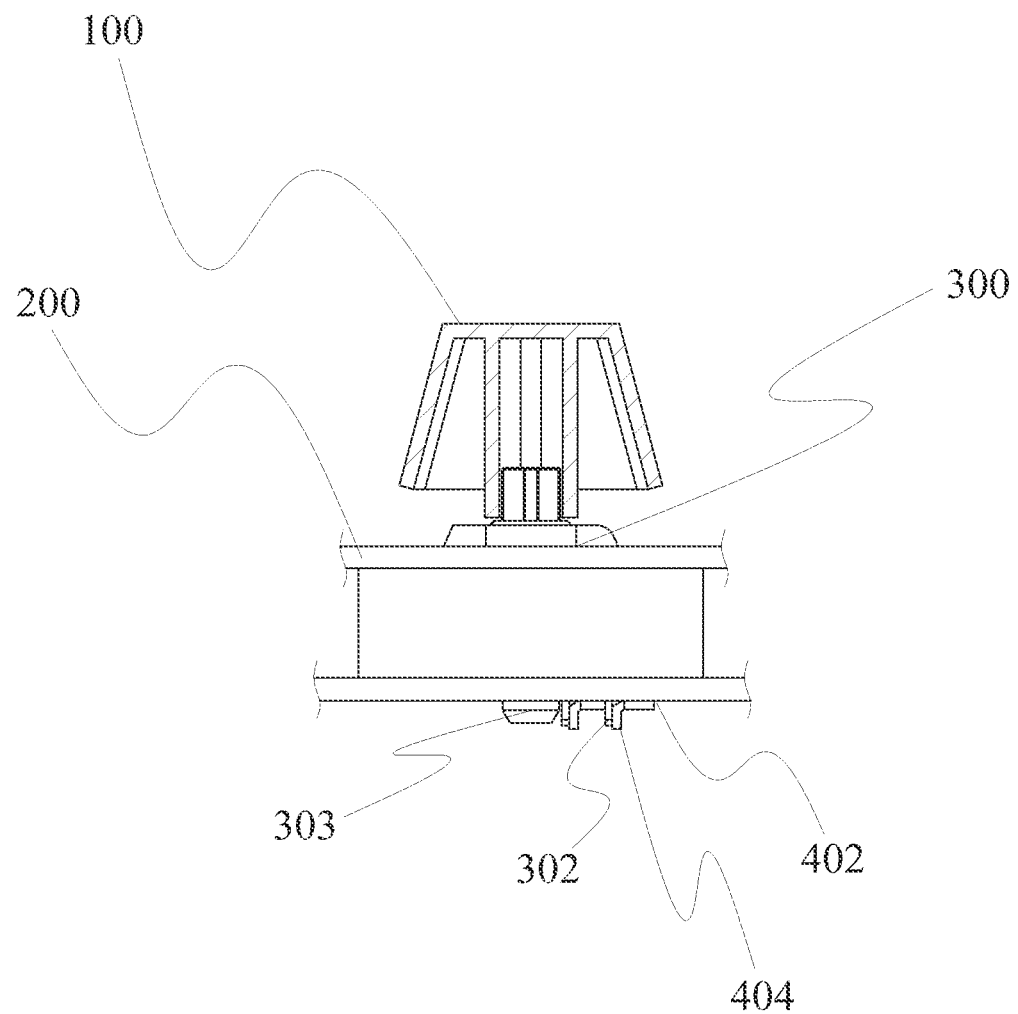
FIG. 16 illustrates a sectional view of the input device referring to FIG. 15 in accordance with still another step in the manufacturing method of the input device according to the first embodiment of the present invention.

FIGS. 14-16 illustrate step S106 in the method of manufacturing the input device according to the first embodiment of the present invention. As shown in the figures, in the step of S106, a plurality of keycaps 100 are provided at the other side of the plunger 301 with respect to the pins 302, and the keycaps 100 are assembled through the openings 201 of the second shell 200. Thus, the input device 10 according to the first embodiment is completed.

It is noted that the sequence of the manufacturing method of the first embodiment is not limited as mentioned. People with ordinary skill can modify the sequence of the manufacturing method in consideration of the production plan or the need without departing from the spirit of the present invention.

Figure 18:
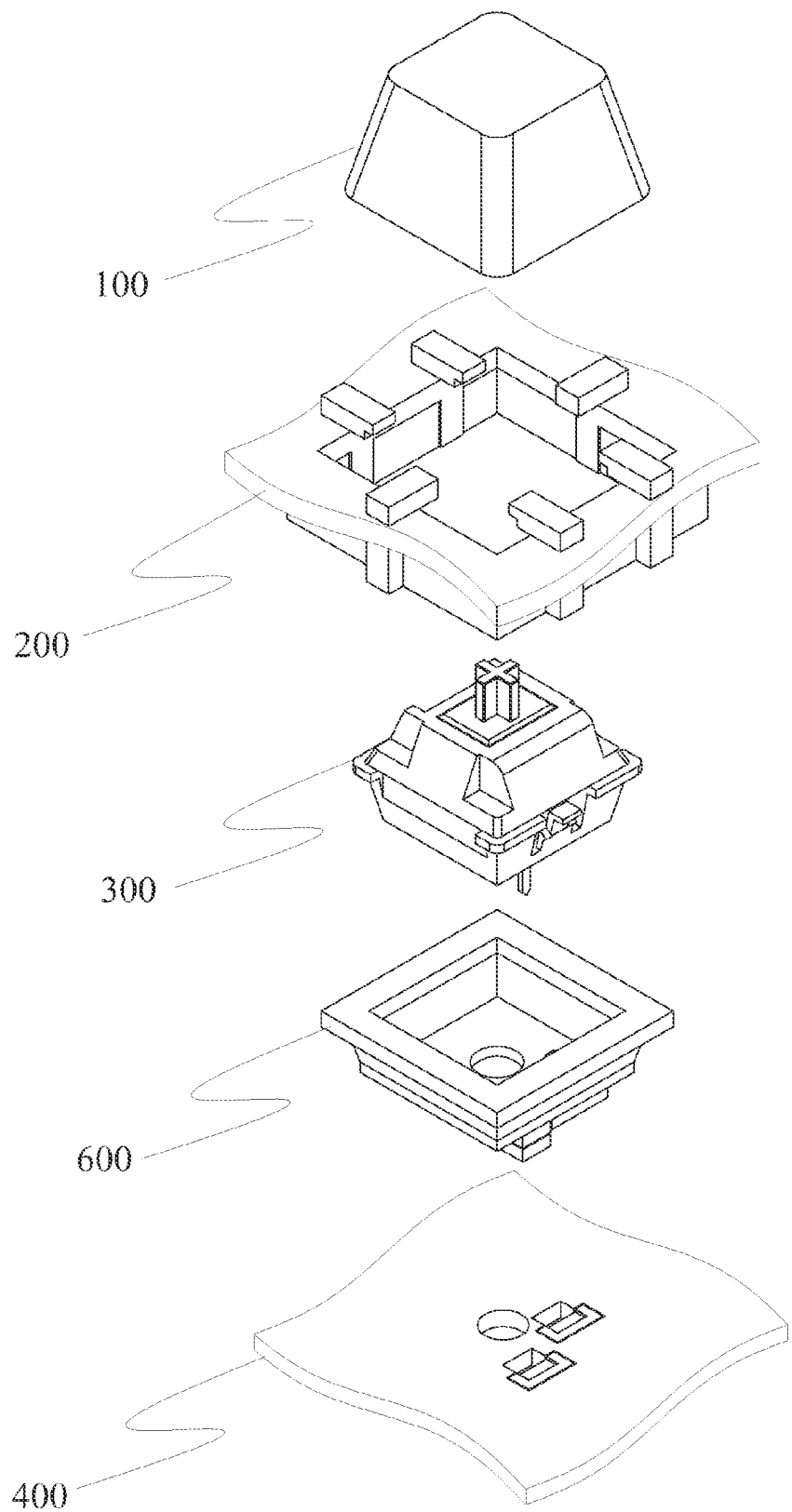
FIG. 18 illustrates a partial view of the input device according to a second embodiment of the present invention.

FIG. 18 is a partial view of the input device 10 according to a second embodiment of the present invention. The second embodiment is generally similar to the first embodiment except in the former a plurality of bases 600 are added and the structure of the circuit board 400 is changed due to the bases 600.

Figure 19:
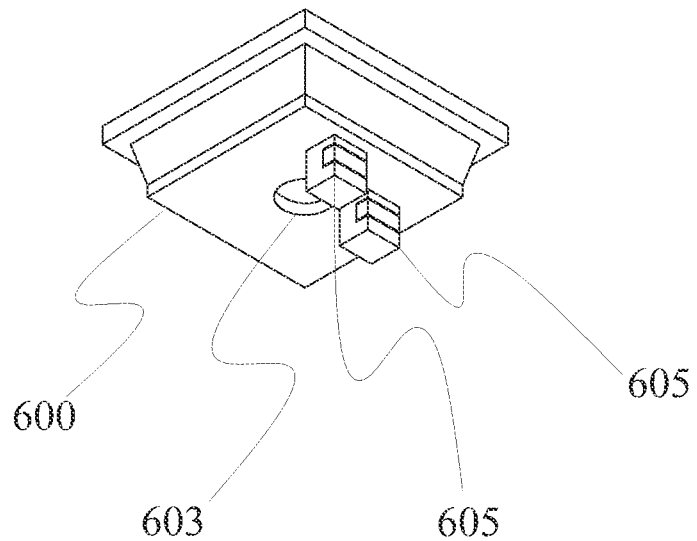
FIG. 19 illustrates a partial view of a base according to the second embodiment of the present invention.
Figure 20:
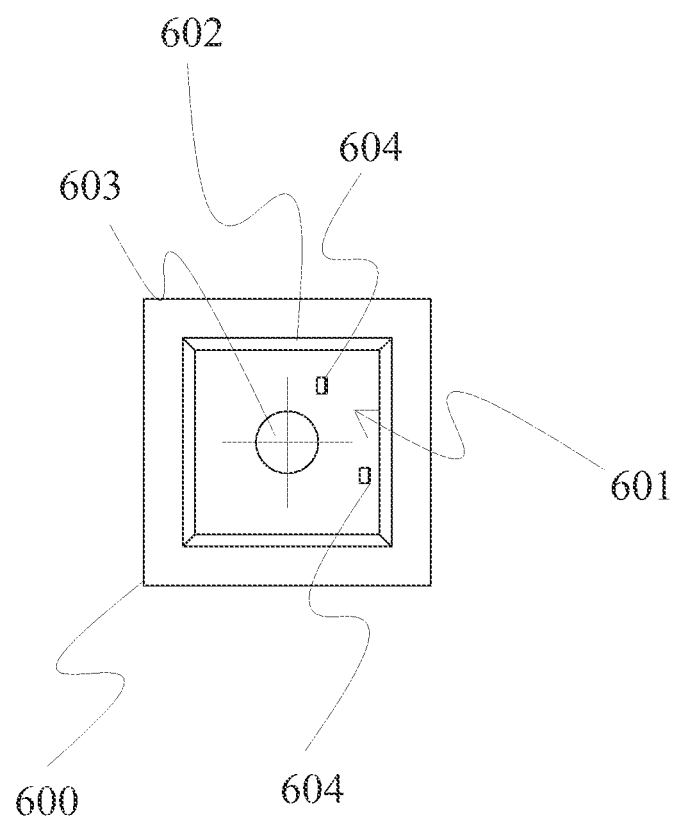
FIG. 20 illustrates another partial view of the base according to the second embodiment of the present invention.
Figure 21:
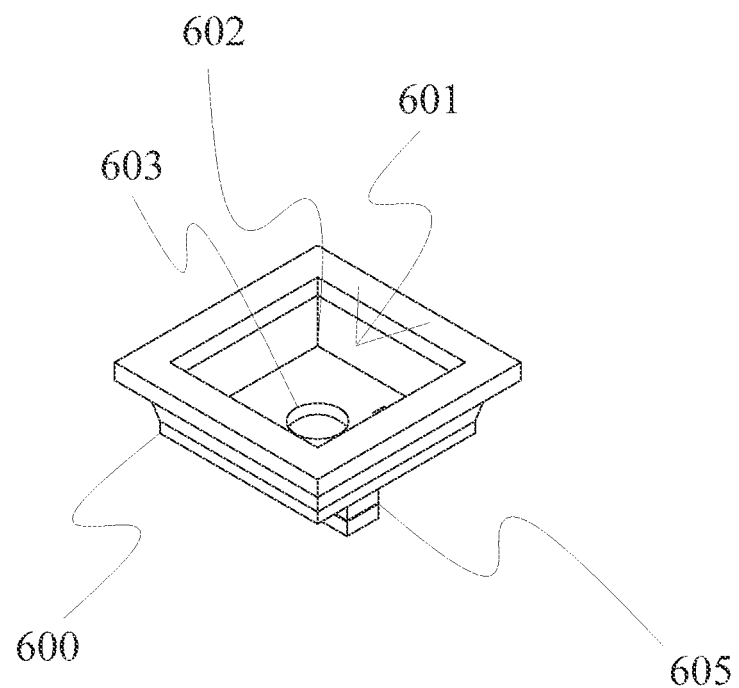
FIG. 21 illustrates another partial view of the base according to the second embodiment of the present invention.

FIGS. 19-21 are different partial views of the base 600 according to the second embodiment of the present invention. In the input device 10 according to the second embodiment of the present invention, as shown in FIGS. 18-21, a plurality of bases 600 are provided on the second surface 405 of the circuit board 400. Each of the bases 600 includes a depression 601, a plurality of conductive portions 605 and a latching portion 602. The latching portion 602 is formed at outer edge of each depression 601. A fastening hole 603 and a plurality of insulating holes 604 are formed at the bottom of the depression 601. When the mechanical switch 300 are detachably provided to the base 600, the mechanical switch 300 is engaged with the depression 601. The positioning column 303 of the mechanical switch 300 is inserted in the hole 403 through the fastening hole 603, and the pins 302 of the mechanical switch 300 pass through the insulating hole 604 correspondingly.

When the second shell 200 is depressed against the mechanical switches 300 in the second embodiment as in the first embodiment, since the latching portion 602 has a relatively greater width than the carrying portion 306, the second shell 200 is also depressed against the latching portion 602. The latching portion 602 is helpful in increasing the contact area between the mechanical switch 300 and the press-sensitive portion 203, so the mechanical switches 300 could be clasped and stabilized between the second shell 200 and the circuit board 400. As a result, the mechanical switches 300 will not separate from the circuit board 400 under the influence of strong shaking or external impact.

Figure 22:
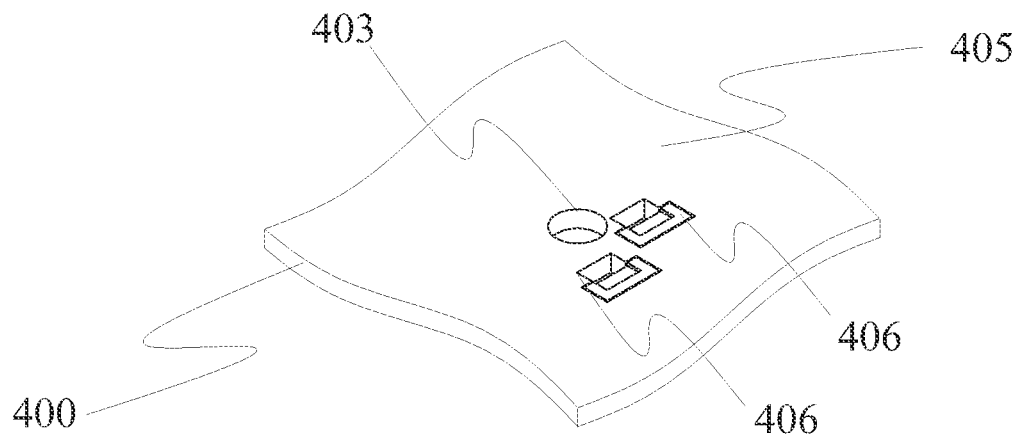
FIG. 22 illustrates a partial view of the circuit board according to the second embodiment of the present invention.
Figure 23:
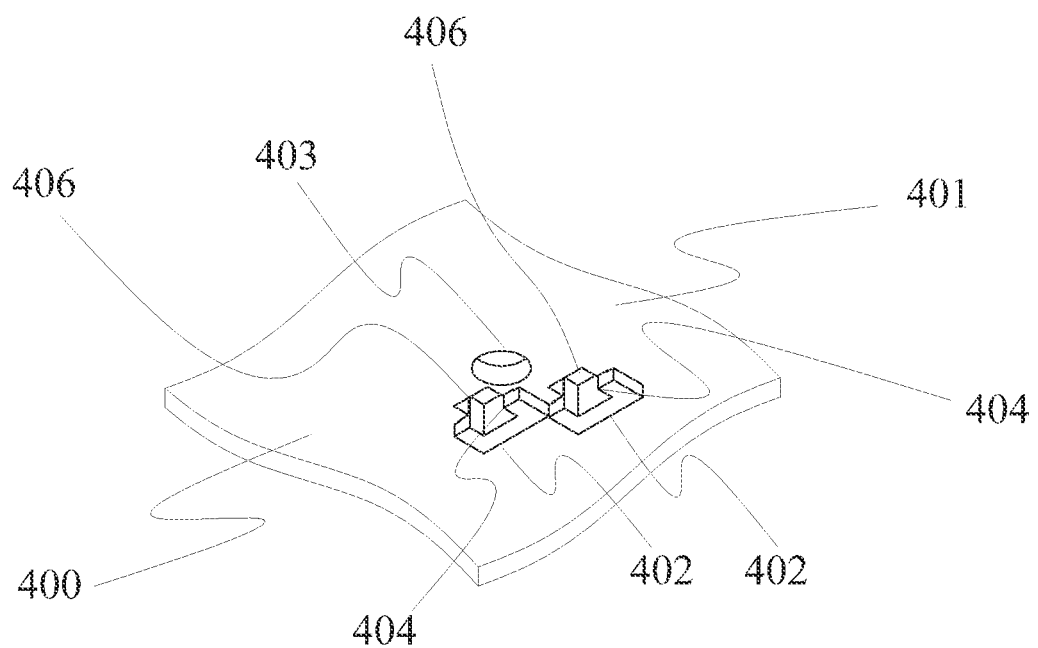
FIG. 23 illustrates another partial view of the circuit board according to the second embodiment of the present invention.

Besides, the circuit board 400 of the input device 10 in the second embodiment is different from that in the first embodiment. FIGS. 22-23 are partial views of the circuit board 400 according to the second embodiment of the present invention. Referring to FIGS. 22 and 23, and also FIGS. 4 and 5, the perforations 406 of the circuit board 400 in the second embodiment has a larger diameter, so that the conductive portions 605 of the bases 600 may be embedded in the perforations 406 and attached against the coupling sections 404 of the conductive sheets 402. In addition, the pins 302 of the mechanical switches 300 are also electrically plugged in the conductive portions 605 of the bases and indirectly attached to the coupling section 404 of the conductive sheets 402 through the physical contact between the conductive portions 605 and the conductive sheets 402 of the circuit board 400.

Figure 35:
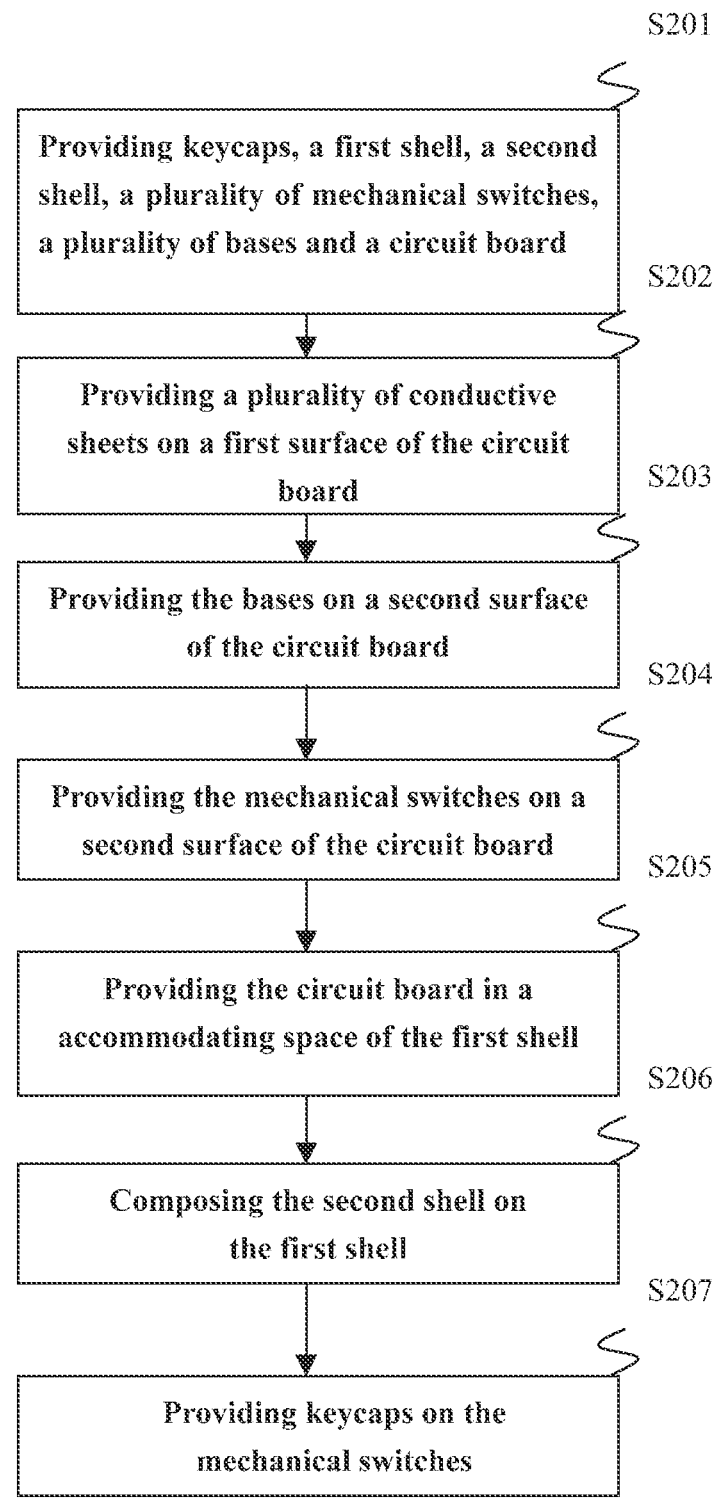
FIG. 35 illustrates a flow chart in the manufacture method of the input device according to the second embodiment in the present invention.

FIG. 35 is a flow chart of the method of manufacturing the input device 10 according to the second embodiment in the present invention that includes the following steps. First, keycaps 100, a second shell 200, a plurality of mechanical switches 300, bases 600, a circuit board 400 and a first shell 500 are provided (S201). Then, a plurality of conductive sheets 402 are provided for the circuit board 400 on the first surface 401 thereof in a similar way to the step of S102 in the first embodiment. The details thereof will not be described repetitively here.

Figure 24:
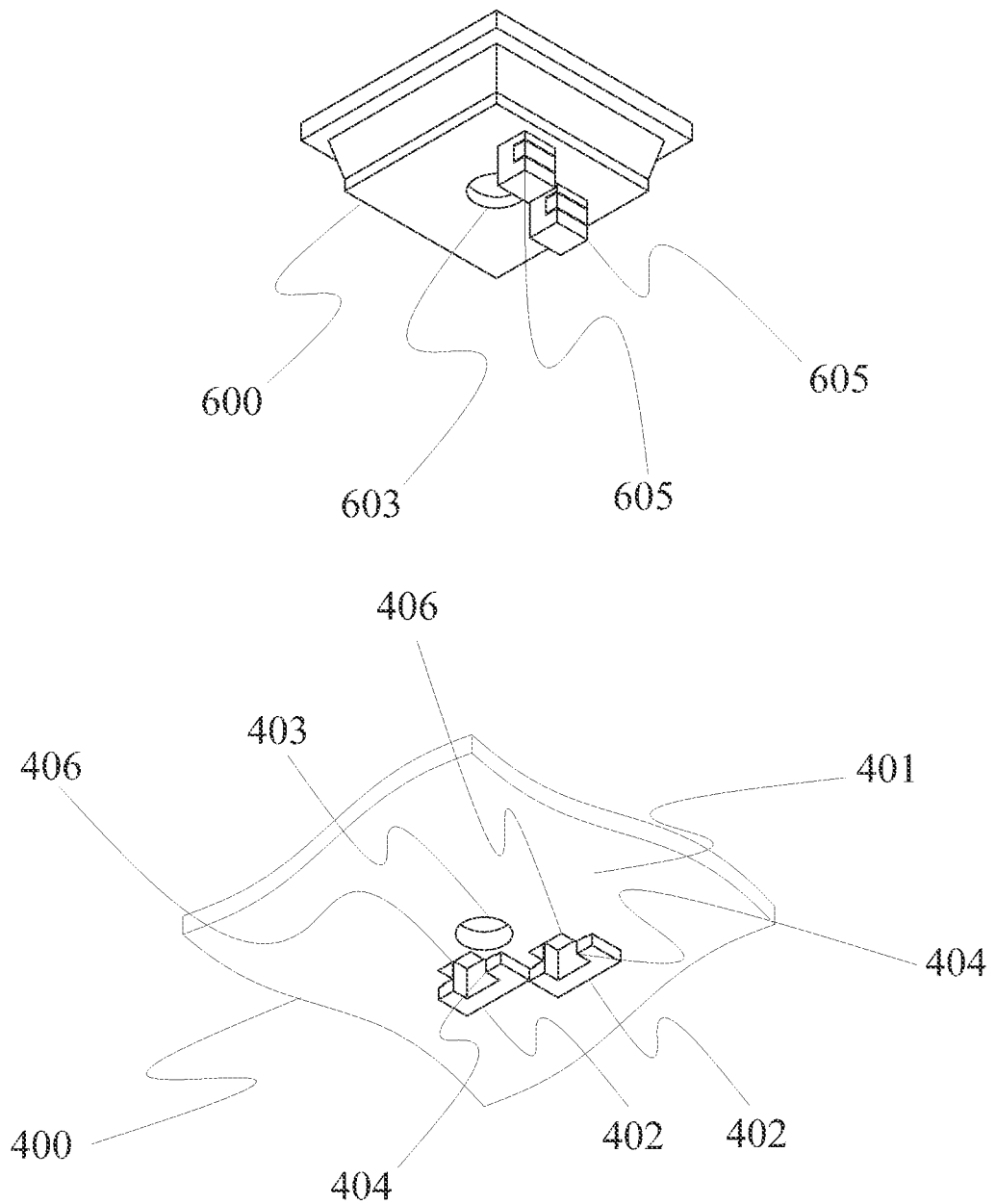
FIG. 24 illustrates an exploded view of the input device in accordance with a step in a manufacturing method of the input device according to the second embodiment of the present invention.
Figure 25:
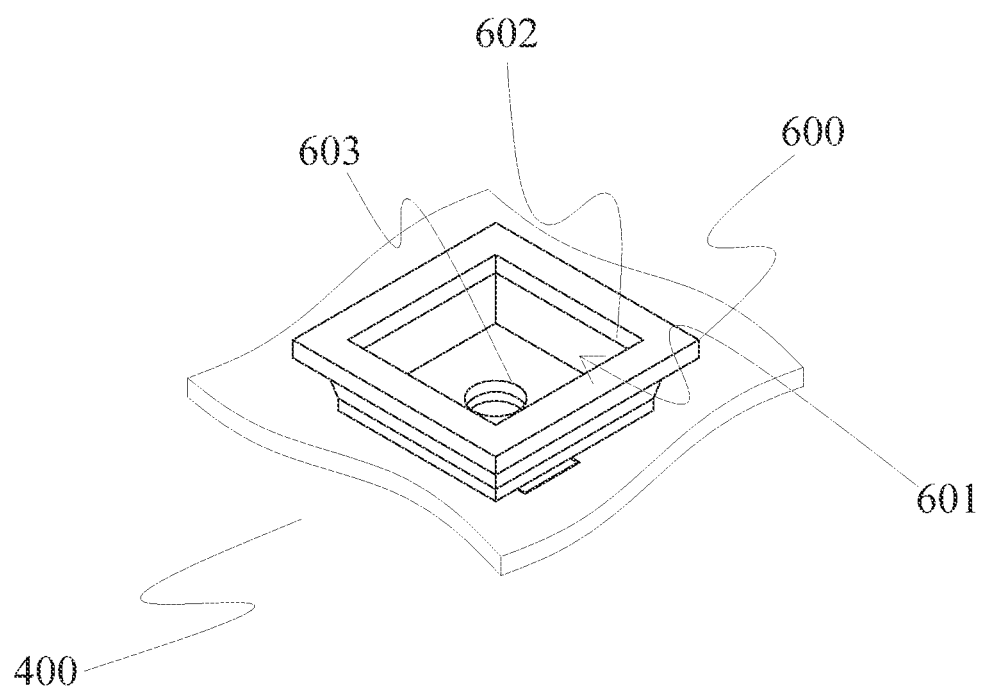
FIG. 25 illustrates a three-dimensional side view of the input device in accordance with a step in a manufacturing method of the input device according to the second embodiment of the present invention.
Figure 26:
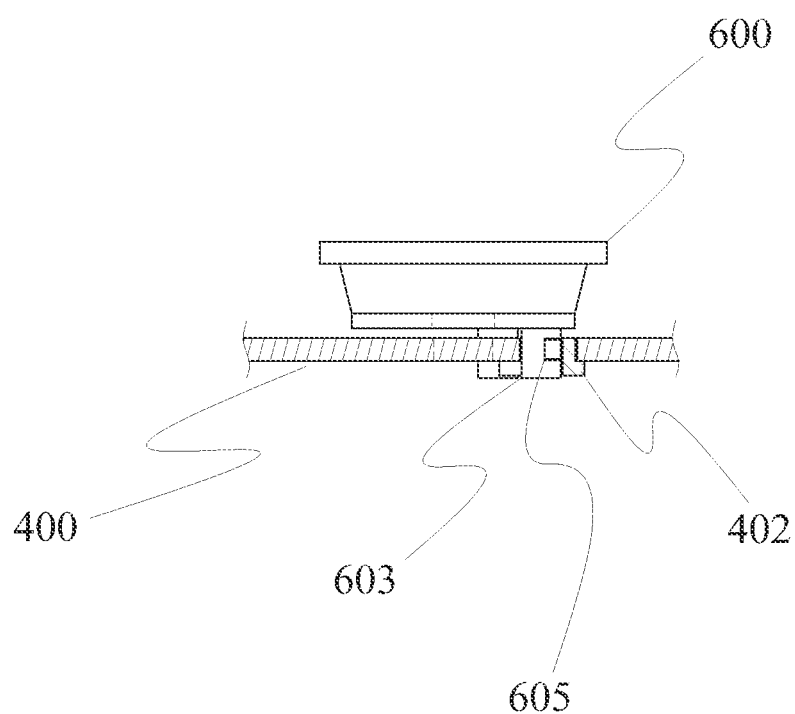
FIG. 26 illustrates a sectional view of the input device referring to FIG. 25 in accordance with a step in a manufacturing method of the input device according to the second embodiment of the present invention.

FIGS. 24-26 illustrate step S203 in the method of manufacturing the input device according to the second embodiment in the present invention. In the step of S203, the bases 600 are provided on the second surface 405 of the circuit board 400 in a way that the fastening holes 603 of the bases 600 correspond to the holes 403. At the same time, the conductive portions 605 of the bases 600 are embedded in the corresponding perforations 406 of the circuit board 400 and contact the coupling section 404 of the conductive sheets 402.

Figure 27:
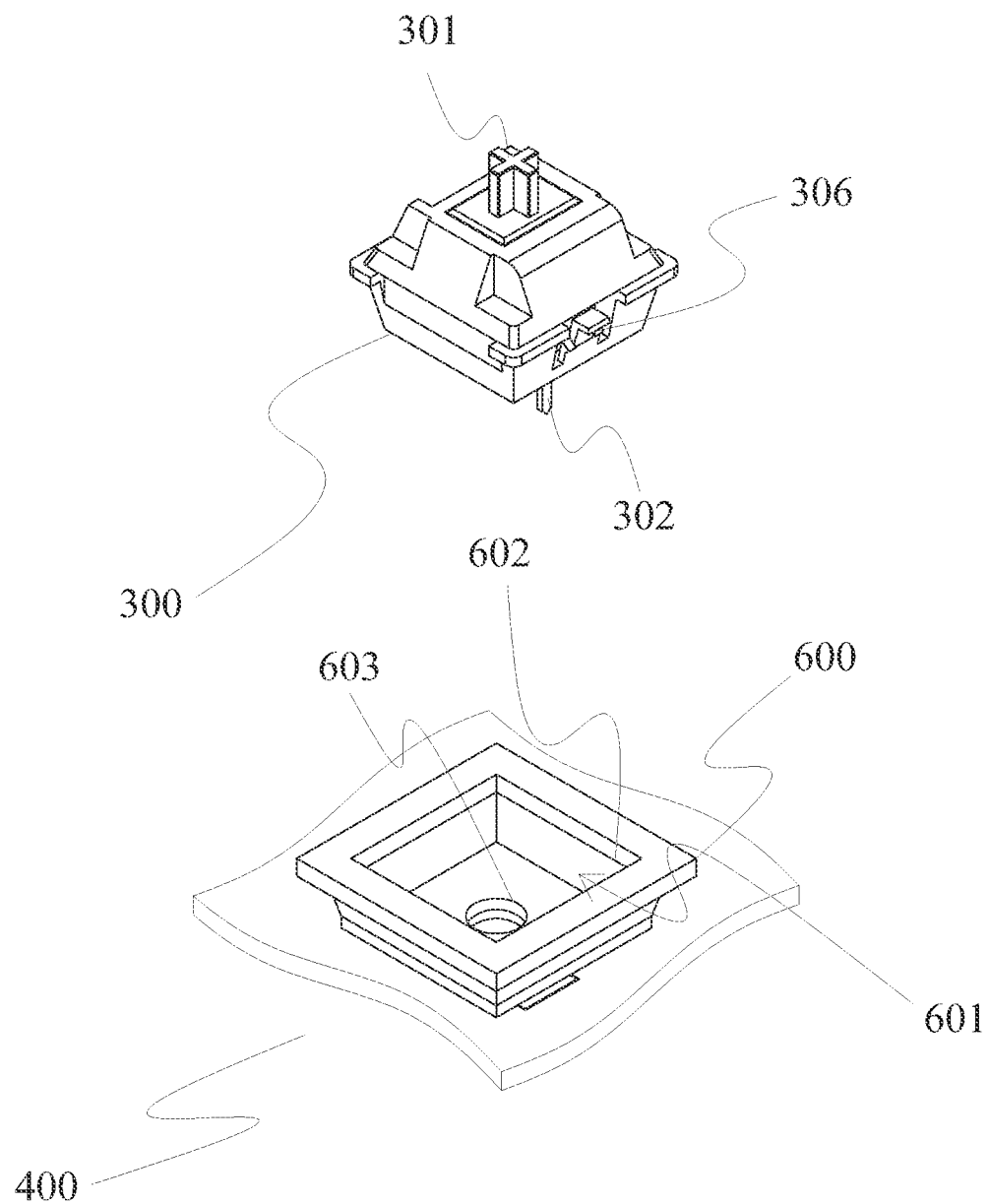
FIG. 27 illustrates an exploded view of the input device in accordance with another step in the manufacture method of the input device according to the second embodiment of the present invention.
Figure 28:
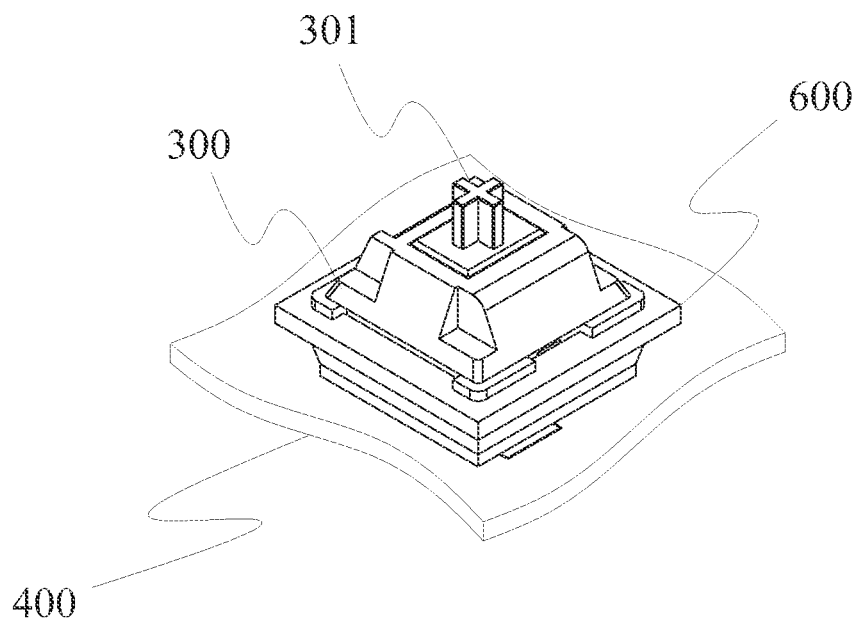
FIG. 28 illustrates a three-dimensional side view of the input device in accordance with another step in the manufacture method of the input device according to the second embodiment of the present invention.
Figure 29:
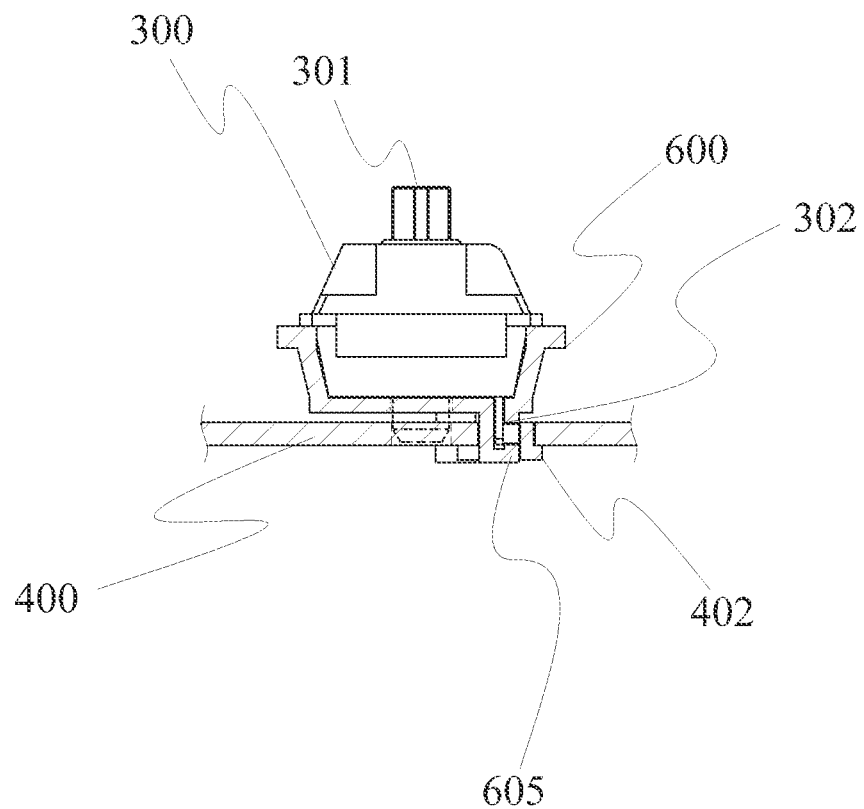
FIG. 29 illustrates a sectional view of the input device referring to FIG. 28 in accordance with another step in the manufacture method of the input device according to the second embodiment of the present invention.

FIGS. 27-29 illustrate step S204 in the manufacturing method of the input device according to the second embodiment in the present invention. Next, in the step of S204, the mechanical switches 300 are provided on the bases 600. The mechanical switches 300 are engaged with the corresponding depressions 601 of the bases 600 individually with the plungers 301 in a way that the positioning column 303 is inserted in the fastening hole 603 of the bases 600. The pins 302 are configured to pass through the insulating hole 604 and be electrically connected to the coupling section 404 of the conductive sheets 402 on the circuit board 400 by way of the conductive portion 605 of the bases 600.

Figure 30:
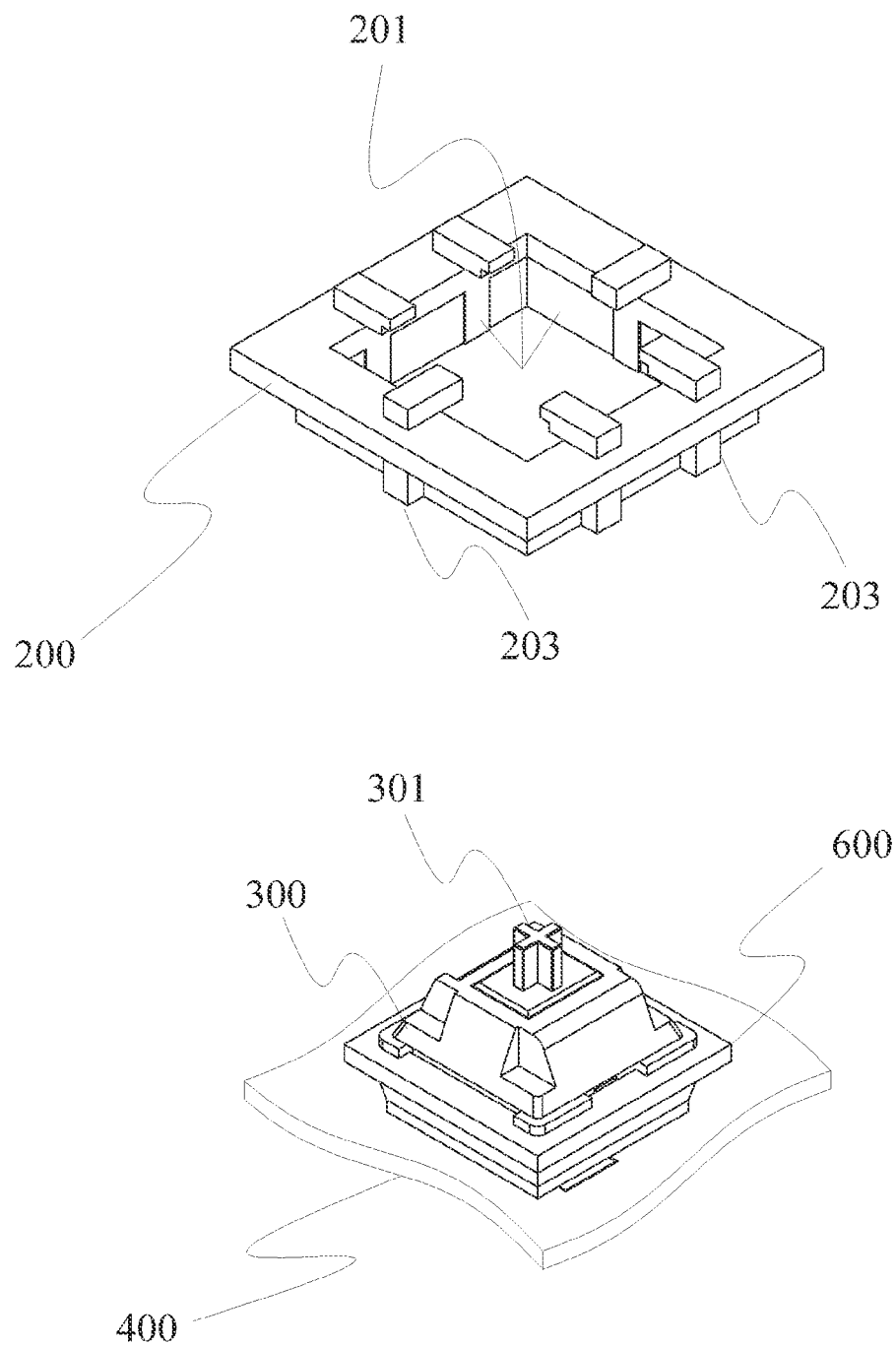
FIG. 30 illustrates an exploded view of the input device in accordance with a further step in the manufacture method of the input device according to the second embodiment of the present invention.
Figure 31:
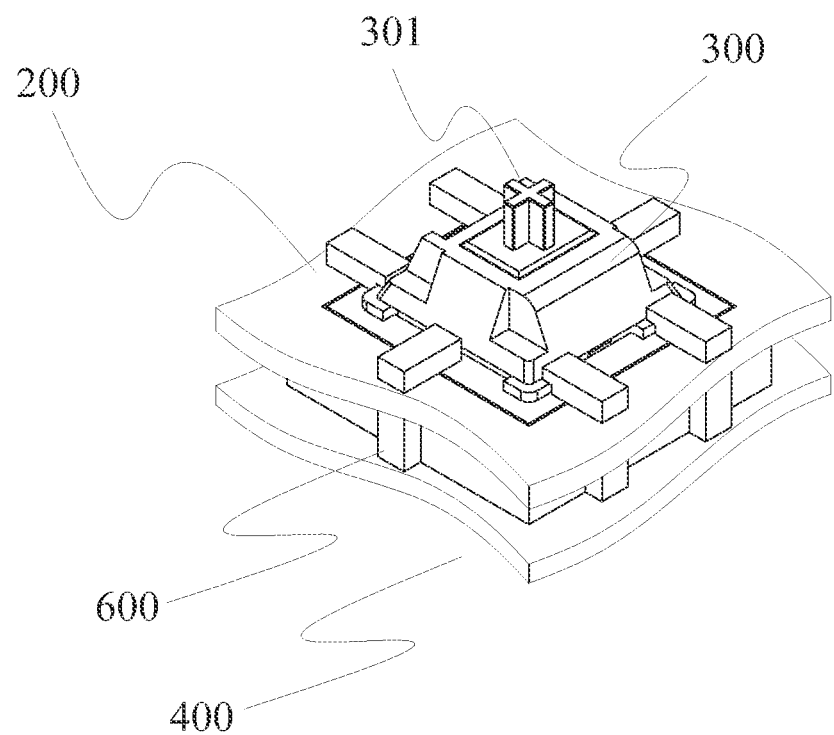
FIG. 31 illustrates a three-dimensional side view of the input device in accordance with a further step in the manufacture method of the input device according to the second embodiment of the present invention.
Figure 32:
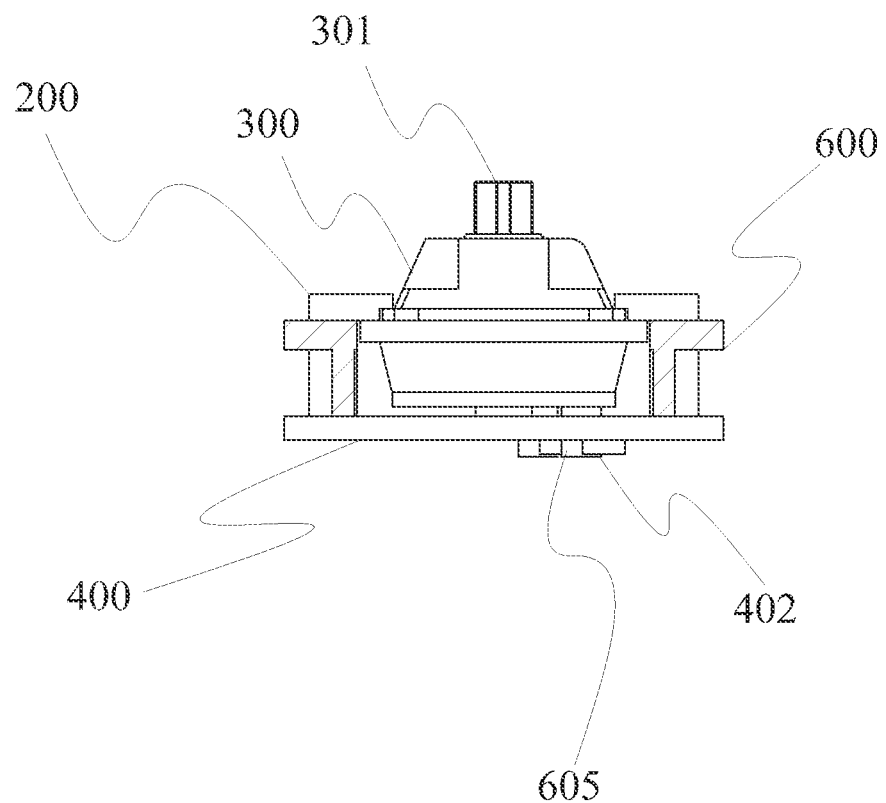
FIG. 32 illustrates a sectional view of the input device referring to FIG. 31 in accordance with a further step in the manufacture method of the input device according to the second embodiment of the present invention.

FIGS. 30-32 illustrate steps S205 and S206 in the method of manufacturing the input device 10 according to the second embodiment of the present invention. In the step of S205, the circuit board 400 is provided in the space 501 of the first shell 500. In the step of S206, the second shell 200 is combined with the first shell 500, the second shell 200 is depressed against the carrying portions 306 of the mechanical switches through the press-sensitive portion 203. In this way, the plunger 301 of the mechanical switch 300 could be clasped and stabilized between the second shell 200 and the circuit board 400 with part thereof assembled through the opening of the second shell 200. Therefore, when the second shell 200 is combined with the first shell 500, the second shell 200 is depressed against both the latching portion 602 of the base 600 and the carrying portion 306 of the mechanical switch 300. The mechanical switch 300 will thus be stablized by the "clasping effect" of the second shell 200 and the circuit board 400.

Figure 33:
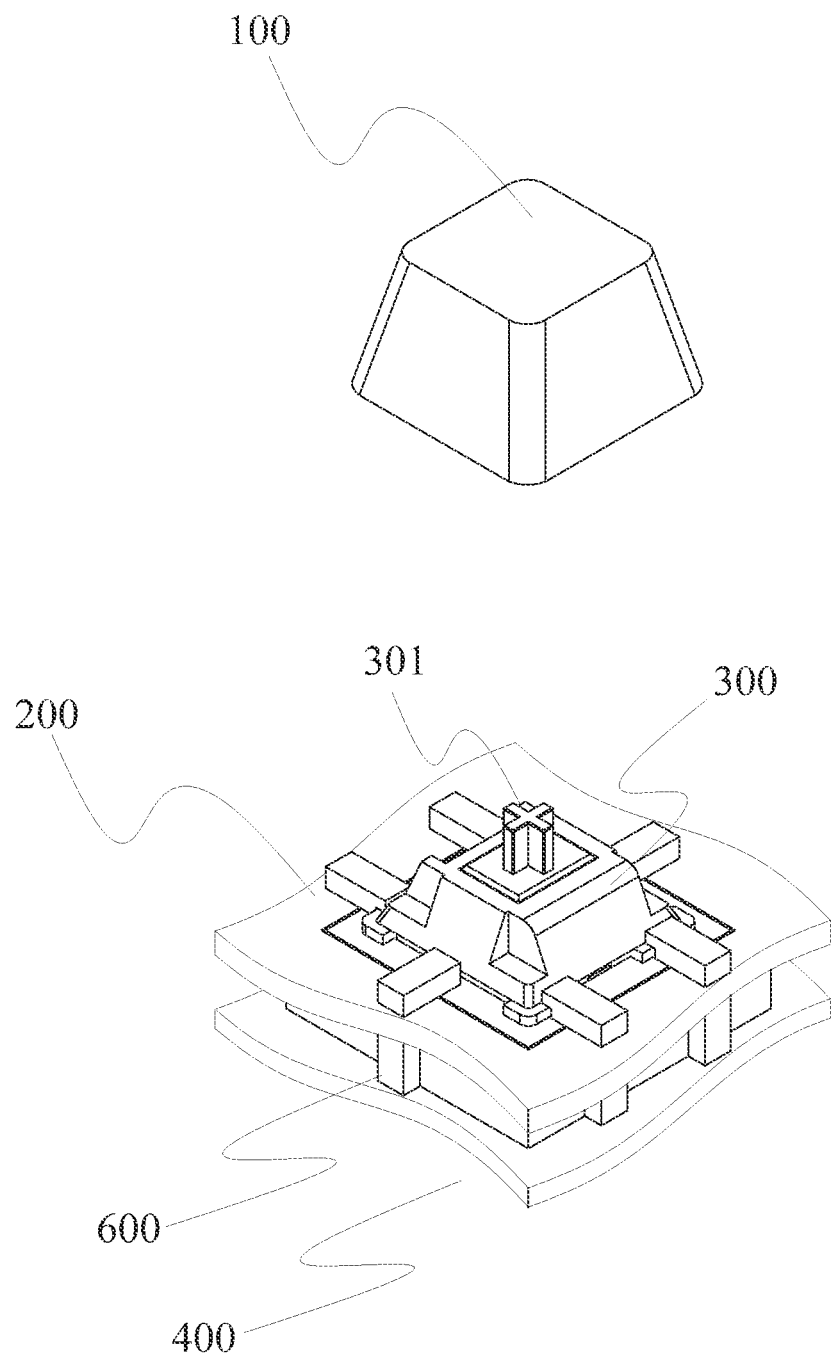
FIG. 33 illustrates an exploded view of the input device in accordance with a further another step in the manufacture method of the input device according to the second embodiment of the present invention.
Figure 34:
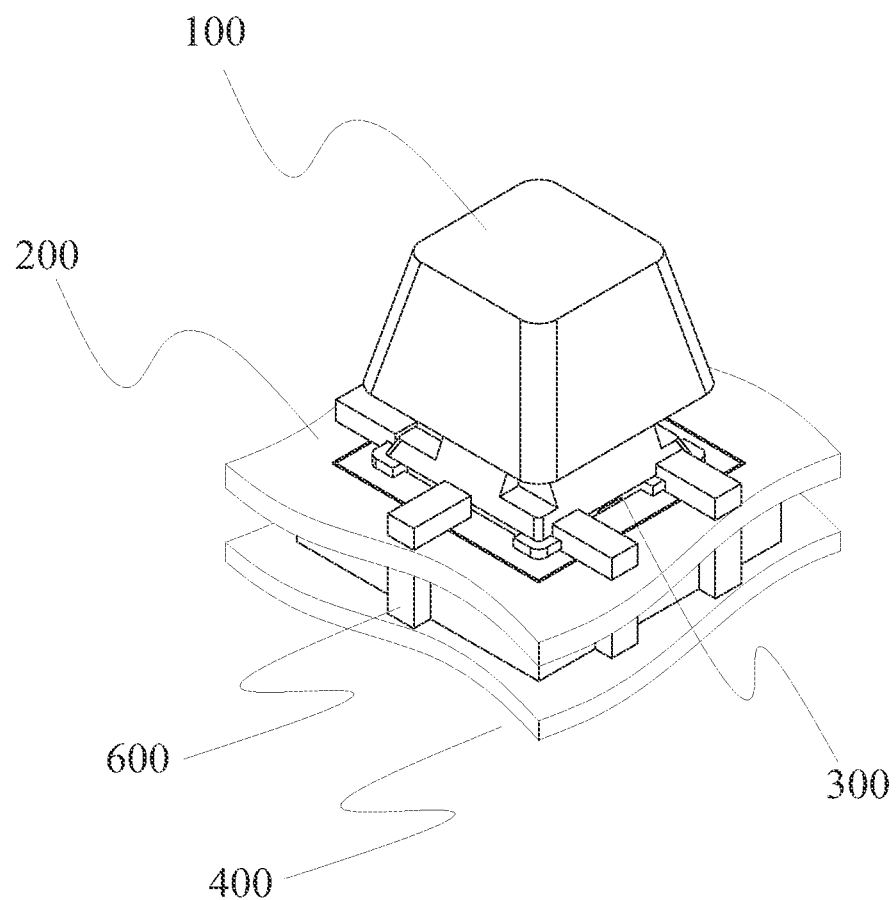
FIG. 34 illustrates an three-dimensional side view of the input device in accordance with a further another step in the manufacture method of the input device according to the second embodiment of the present invention.

FIGS. 33-34 illustrate step S207 in the method of manufacturing the input device 10 according to the second embodiment of the present invention. Then in the step of S207, the keycap 100 is provided at the other side of the mechanical switch 300 with respect to the pins 302 of mechanical switch 300 and is configured to be assembled through the opening 201 of the second shell 200. Thus the manufacture steps of the input device 10 in the second embodiment are complete.

In the input device of the invention, the mechanical switch is provided to the circuit board in a modularized way by making the mechanical switch matched with the hole of the circuit board. The mechanical switch is electrically connected to the circuit board via the multiple pins passing through the perforations of the circuit board for touching the conductive sheet of the circuit board. As a result, it will greatly increase user's convenience on replacing the mechanical switch because welding or soldering is not necessary. Besides, the mechanical switch is provided stably within the input device with the help of the clasping force formed by the second shell and circuit board.

Furthermore, because of the direct and convenient replacement of the mechanical switch, the user may desirably choose different types of mechanical switches according to his/her need and habit or may use mechanical switches with different pressure loads for different keys of the input device.

Moreover, since the mechanical switch can be replaced individually, the user doesn't have to discard the input device if only one or two of the mechanical switches are broken. It is convenient and economic as the service life of the entire input device is extended.

While the disclosure has been described in terms of what is presently consider to be the preferred embodiments, it is to be understood that the disclosure needs not be limited to the disclosed embodiment. On the contrary, it is intended cover various modifications and similar arrangements included within the spirit and scope of the appended claims which are to be accorded with the broadest interpretation so as to encompass all such modification and similar structures. It is therefore intended by the appended claims to define the true scope of the invention.

What is claimed is:

1. An input device comprising:
   a circuit board comprising a first surface, a second surface formed opposite to the first surface, and a plurality of conductive sheets, a plurality of holes and perforations being formed on the circuit board and the perforations being deployed around each of the holes in pairs, the conductive sheets being provided adjacent to the holes in pairs on the first surface and each of the conductive sheets comprising a coupling section, the coupling section being bent away from the first surface and the second surface;
   a plurality of mechanical switches detachably provided on the second surface of the circuit board, each of the mechanical switches comprising a plunger, a plurality of pins, and a positioning column extended from the bottom of the mechanical switch, the positioning column being inserted in the hole, the pin being connected to the plunger at one end and passing through the circuit board at the other end to contact with the coupling section of the conductive sheet, and the mechanical switches are electrically connected to the circuit board respectively; and
   a plurality of bases disposed on the second surface of the circuit board, wherein each of the bases comprises a depression and a latching portion, the latching portion of each base is disposed on an outer edge of the depression, a fastening hole and a plurality of insulating holes are formed on the bottom of the depression, the mechanical switch is engaged with the depression, the positioning column is inserted in the hole through the fastening hole, the pins pass through the insulating holes correspondingly.

2. The input device according to claim 1, further comprising:
   a first shell forming a space, the circuit board being accommodated within the space; and
      a second shell combined with the first shell and depressed against the plungers of the mechanical switches, the second shell further comprising a plurality of openings, the openings being corresponding to the mechanical switches, and the plunger of each mechanical switch assembled through the opening.

3. The input device according to claim 2, wherein the second shell comprises a plurality of press-sensitive portions, each of the mechanical switches comprises a carrying portion, and the second shell is depressed the carrying portion of each mechanical switch through the corresponding press-sensitive portion.

4. The input device according to claim 2, wherein the second shell is depressed on the latching portion.

5. The input device according to claim 4, wherein each of the bases further comprises a plurality of conductive portions, the conductive portions are embedded correspondingly in the perforations and attached to the coupling sections of the conductive sheets, the pins of the mechanical switch are electrically plugged in the conductive portions through the insulating holes so as to be attached to the coupling sections of the conductive sheet by way of the conductive portions.

6. The input device according to claim 4, wherein the width of the latching portions is greater than the width of the carrying portions.

7. The input device according to claim 1 further comprising a plurality of keycaps, each of the keycaps is detachably provided at the other side of the corresponding plunger with respect to the positioning column and pins.

8. The input device according to claim 1, wherein the mechanical switches have identical or different pressure loads from one another.

9. A manufacturing method of an input device comprising steps of:
   providing a circuit board on which a plurality of holes are formed;
   providing a plurality of conductive sheets on a first surface of the circuit board, the conductive sheets being deployed at one side of the circuit board around each hole in pairs, each of the conductive sheets being bent to form a coupling section;
   providing a plurality of mechanical switches, each of which comprises a plunger, a plurality of pins, and a positioning column extended from the bottom of the mechanical switch;
   providing the mechanical switches on a second surface of the circuit board, inserting the positioning columns of the mechanical switches in the holes, making the pins pass through the circuit board and attached against the corresponding coupling sections of the conductive sheets for the mechanical switch electrically to be connected to the circuit board;
   providing a plurality of bases, each of which comprises a depression and a latching portion, and a fastening hole and a plurality of insulating holes are formed on the bottom of the depression;
   disposing the bases on the second surface of the circuit board so that the fastening holes of the bases correspond to the holes; and
   providing the mechanical switches on the bases, the mechanical switches being engaged with the corresponding depression on the bases individually, the positioning column being inserted in the fastening hole of the base and the pins passing through the corresponding insulating holes.

10. The manufacturing method of the input device according to claim 9, further comprising steps of:
    providing a first shell and a second shell;
    providing the circuit board in a space of the first shell; and
    combining the second shell with the first shell and depressing the second shell against the plungers of the mechanical switches and making the plunger of each mechanical switch to fastened between the second shell and the circuit board and assembled through an corresponding opening on the second shell.

11. The manufacturing method of the input device according to claim 10, wherein
    the second shell is depressed against the latching portion of the bases when combining the second shell with the first shell.

12. The manufacturing method of the input device according to claim 11, wherein the bases are connected to the circuit board by embedding a plurality of conductive portions of the bases in a plurality of perforations of the circuit board so as to be attached to the coupling sections of the conductive sheets, wherein the pins of the mechanical switches are electrically plugged in the conductive portions through the insulating holes.

13. The manufacturing method of the input device according to claim 10, wherein the second shell is depressed against a carrying portion of the mechanical switch by way of a press-sensitive portion thereof.

14. The manufacturing method of the input device according to claim 9, further comprising steps of:
   providing a plurality of keycaps at the other side of the corresponding plungers respectively with respect to the positioning column and pins and making the keycaps exposed form the corresponding openings of the second shell.

15. The manufacturing method of the input device according to claim 9, wherein in the step of providing the mechanical switches on the second surface of the circuit board, the mechanical switches having identical or different pressure loads from one another are used.

\* \* \* \* \*